(12) United States Patent
Navar et al.

(10) Patent No.: US 9,531,686 B2
(45) Date of Patent: Dec. 27, 2016

(54) STATUTORY LICENSE RESTRICTED DIGITAL MEDIA PLAYBACK ON PORTABLE DEVICES

(71) Applicant: SONY INTERACTIVE ENTERTAINMENT AMERICA LLC, San Mateo, CA (US)

(72) Inventors: Murgesh Navar, San Jose, CA (US); Andrey Yruski, Pacifica, CA (US); Rajiv Puranik, Cupertino, CA (US); Michael Hsu, San Jose, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 14 days.

(21) Appl. No.: 14/242,664

(22) Filed: Apr. 1, 2014

(65) Prior Publication Data

US 2014/0215224 A1    Jul. 31, 2014

Related U.S. Application Data

(63) Continuation of application No. 12/717,108, filed on Mar. 3, 2010, now Pat. No. 8,763,157, which is a
(Continued)

(51) Int. Cl.
*H04L 29/06*    (2006.01)
*G06F 21/62*    (2013.01)
(Continued)

(52) U.S. Cl.
CPC ........... *H04L 63/0457* (2013.01); *G06F 21/10* (2013.01); *G06F 21/6209* (2013.01); *H04L 67/06* (2013.01); *H04L 63/10* (2013.01); *H04L 65/1059* (2013.01)

(58) Field of Classification Search
CPC .......... G06F 21/10; G06F 21/30; G06F 21/31; G06F 21/33; G06F 21/335; G06F 21/44; G06F 21/60; G06F 21/62; G06F 21/6209; G06F 2221/2141; H04L 65/1054
See application file for complete search history.

(56) References Cited

U.S. PATENT DOCUMENTS 4,521,021 A    6/1985  Dixon
4,542,897 A    9/1985  Melton et al.
(Continued)

FOREIGN PATENT DOCUMENTS

AU    9959097    11/1999
CA    2106122    3/1994
(Continued)

OTHER PUBLICATIONS

US 8,689,348, 04/2014, Navar (withdrawn)
(Continued)

*Primary Examiner* — Eric W Shepperd
(74) *Attorney, Agent, or Firm* — Polsinelli LLP

(57) ABSTRACT

Systems and methods are described for, e.g., providing a statutory audio content service on a portable device that complies with the provisions of the Digital Millennium Copyright Act (DMCA). The user can select a playlist subject to DMCA restrictions but cannot access individual items. Content playback, including skipping of content, is restricted to enforce relevant DMCA provisions. Encryption used to implement digital rights management (DRM) may be modified to enforce such content play rules or, alternatively, an additional layer of encryption may be imposed. Limitations on playback are stored along with the playlist structure in a form that is protected against modification. Information logging content playback is maintained in protected form to be uploaded and relayed to the service provider for the purpose of calculating royalty payments.

20 Claims, 13 Drawing Sheets

Related U.S. Application Data continuation of application No. 10/924,009, filed on Aug. 23, 2004, now abandoned.

(51) Int. Cl.
  *G06F 21/10* (2013.01)
  *H04L 29/08* (2006.01)

(56) References Cited

U.S. PATENT DOCUMENTS

| | | |
|---|---|---|
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,646,992 A | 7/1997 | Subler et al. |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,762,553 A | 6/1998 | Takasugi et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,878,135 A * | 3/1999 | Blatter ............... H04N 21/4147 348/E5.004 |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford et al. |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,016,348 A * | 1/2000 | Blatter ............... H04N 5/4401 348/E5.004 |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,089,975 A | 7/2000 | Dunn |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,188,398 B1 | 2/2001 | Collins-Rector et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,854 B1 | 8/2001 | Himmel et al. |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,385,596 B1 * | 5/2002 | Wiser ................. G06F 21/10 369/84 |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,496,826 B1 | 12/2002 | Chowdhury et al. |
| 6,513,160 B2 | 1/2003 | Dureau |
| 6,516,338 B1 | 2/2003 | Landsman et al. |

(56) References Cited

U.S. PATENT DOCUMENTS

| | | |
|---|---|---|
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,812 B2 | 8/2003 | Hurtado et al. |
| 6,611,813 B1 | 8/2003 | Bratton |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Petermeier et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,698,020 B1 | 2/2004 | Zigmond et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 | 3/2004 | Goldberg et al. |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,799,327 B1 | 9/2004 | Reynolds et al. |
| 6,814,663 B2 | 11/2004 | Edwards et al. |
| 6,820,277 B1 | 11/2004 | Eldering et al. |
| 6,826,614 B1 | 11/2004 | Hanmann et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,948,062 B1 * | 9/2005 | Clapper ................ H04L 9/0872 713/162 |
| 6,954,728 B1 | 10/2005 | Kusumoto |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,987,221 B2 | 1/2006 | Platt |
| 6,995,788 B2 | 2/2006 | James |
| 7,028,082 B1 | 4/2006 | Rosenberg et al. |
| 7,072,849 B1 | 7/2006 | Filepp et al. |
| 7,076,445 B1 | 7/2006 | Cartwright |
| 7,086,187 B2 | 8/2006 | Bandak |
| 7,136,871 B2 | 11/2006 | Ozer et al. |
| 7,305,442 B1 | 12/2007 | Lundy |
| 7,362,999 B2 | 4/2008 | Petschke et al. |
| 7,363,643 B2 | 4/2008 | Drake et al. |
| 7,370,002 B2 | 5/2008 | Heckerman et al. |
| 7,370,073 B2 | 5/2008 | Yen et al. |
| 7,386,127 B2 | 6/2008 | Bar-On |
| 7,401,140 B2 | 7/2008 | Goulden et al. |
| 7,421,454 B2 | 9/2008 | DeShan et al. |
| 7,437,368 B1 | 10/2008 | Kolluri et al. |
| 7,466,823 B2 | 12/2008 | Vestergaard et al. |
| 7,487,112 B2 | 2/2009 | Barnes, Jr. |
| 7,594,189 B1 | 9/2009 | Walker et al. |
| 7,707,485 B2 | 4/2010 | Laksono |
| 7,852,222 B2 | 12/2010 | Johnson et al. |
| 8,005,713 B1 | 8/2011 | Sanz-Pastor et al. |
| 8,024,766 B2 | 9/2011 | Addington |
| 8,060,407 B1 | 11/2011 | Delker et al. |
| 8,074,076 B2 | 12/2011 | Courtois |
| 8,175,921 B1 | 5/2012 | Kopra |
| 8,191,088 B2 | 5/2012 | Edwards et al. |
| 8,267,783 B2 | 9/2012 | van Datta |
| 8,272,964 B2 | 9/2012 | van Datta |
| 8,302,030 B2 | 10/2012 | Soroca et al. |
| 8,406,739 B2 | 3/2013 | Hull et al. |
| 8,574,074 B2 | 11/2013 | van Datta |
| 8,626,584 B2 | 1/2014 | van Datta |
| 8,645,992 B2 | 2/2014 | Russell |
| 8,676,900 B2 | 3/2014 | Yruski |
| 8,751,310 B2 | 6/2014 | van Datta |
| 8,763,090 B2 | 6/2014 | Capati |
| 8,763,157 B2 | 6/2014 | Navar |
| 8,769,558 B2 | 7/2014 | Navar |
| 8,795,076 B2 | 8/2014 | van Datta |
| 9,015,747 B2 | 4/2015 | Russell |
| 9,129,301 B2 | 9/2015 | van Datta |
| 9,195,991 B2 | 11/2015 | van Datta |
| 9,367,862 B2 | 6/2016 | Yruski |
| 9,466,074 B2 | 10/2016 | van Datta |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |

(56) References Cited

U.S. PATENT DOCUMENTS

| | | |
|---|---|---|
| 2002/0013174 A1 | 1/2002 | Murata |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049679 A1* | 4/2002 | Russell .................... G06F 21/10 705/52 |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |
| 2002/0067730 A1 | 6/2002 | Hinderks et al. |
| 2002/0069240 A1 | 6/2002 | Berk |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0078441 A1 | 6/2002 | Drake et al. |
| 2002/0078444 A1 | 6/2002 | Krewin et al. |
| 2002/0080968 A1* | 6/2002 | Olsson ................ H04L 63/0407 380/270 |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1 | 7/2002 | Zustak |
| 2002/0087403 A1 | 7/2002 | Meyers et al. |
| 2002/0087887 A1 | 7/2002 | Busam et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | De Wolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0114466 A1 | 8/2002 | Tanaka et al. |
| 2002/0116284 A1 | 8/2002 | Steelman et al. |
| 2002/0120574 A1* | 8/2002 | Ezaki .................... G06Q 30/06 705/51 |
| 2002/0120589 A1 | 8/2002 | Aoki |
| 2002/0122052 A1 | 9/2002 | Reich et al. |
| 2002/0123928 A1 | 9/2002 | Eldering et al. |
| 2002/0129362 A1 | 9/2002 | Chang et al. |
| 2002/0129368 A1 | 9/2002 | Schlack et al. |
| 2002/0133398 A1 | 9/2002 | Geller et al. |
| 2002/0136407 A1 | 9/2002 | Denning et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143782 A1* | 10/2002 | Headings .......... G06F 17/30017 |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0159304 A1* | 10/2002 | Morita .................... G06F 21/10 365/200 |
| 2002/0161625 A1 | 10/2002 | Brito-Valladares et al. |
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0018527 A1 | 1/2003 | Filepp et al. |
| 2003/0018797 A1* | 1/2003 | Dunning ................ G06Q 30/02 709/231 |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0060247 A1 | 3/2003 | Goldberg et al. |
| 2003/0066092 A1 | 4/2003 | Wagner et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0074661 A1 | 4/2003 | Krapf et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |

(56) References Cited

U.S. PATENT DOCUMENTS

| | | |
|---|---|---|
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110131 A1 | 6/2003 | Alain et al. |
| 2003/0110171 A1 | 6/2003 | Ozer et al. |
| 2003/0110499 A1 | 6/2003 | Knudson et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0120940 A1* | 6/2003 | Vataja .................... G06F 21/10 713/193 |
| 2003/0126150 A1 | 7/2003 | Chan |
| 2003/0135513 A1 | 7/2003 | Quinn et al. |
| 2003/0139966 A1 | 7/2003 | Sirota et al. |
| 2003/0144044 A1 | 7/2003 | Piarsky |
| 2003/0144048 A1 | 7/2003 | Silva |
| 2003/0149618 A1 | 8/2003 | Sender et al. |
| 2003/0149623 A1 | 8/2003 | Chen |
| 2003/0149938 A1 | 8/2003 | McElfresh et al. |
| 2003/0149975 A1 | 8/2003 | Eldering et al. |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172374 A1 | 9/2003 | Vinson et al. |
| 2003/0172376 A1 | 9/2003 | Coffin, III |
| 2003/0177490 A1 | 9/2003 | Hoshino et al. |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0200452 A1 | 10/2003 | Tagawa et al. |
| 2003/0204632 A1 | 10/2003 | Willebeek-LeMair et al. |
| 2003/0208680 A1 | 11/2003 | Byrne et al. |
| 2003/0212608 A1 | 11/2003 | Cliff |
| 2003/0215211 A1 | 11/2003 | Coffin, III |
| 2003/0216961 A1 | 11/2003 | Barry |
| 2003/0221100 A1* | 11/2003 | Russ .................... H04N 21/8586 713/153 |
| 2003/0221113 A1* | 11/2003 | Kupka .................... G06F 21/10 713/189 |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034536 A1 | 2/2004 | Hughes |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicholas et al. |
| 2004/0057348 A1 | 3/2004 | Shteyn et al. |
| 2004/0059625 A1 | 3/2004 | Schrader |
| 2004/0060060 A1* | 3/2004 | Carr .................... G06F 21/10 725/31 |
| 2004/0064833 A1 | 4/2004 | Lee et al. |
| 2004/0068483 A1* | 4/2004 | Sakurai .................... G06F 21/10 |
| 2004/0068552 A1 | 4/2004 | Kotz et al. |
| 2004/0073482 A1 | 4/2004 | Wiggins et al. |
| 2004/0076404 A1* | 4/2004 | Nakano ............ G11B 20/00086 386/200 |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0088583 A1 | 5/2004 | Yoon et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168063 A1 | 8/2004 | Revital et al. |
| 2004/0168188 A1 | 8/2004 | Bennington et al. |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0186993 A1* | 9/2004 | Risan .................... G06F 21/10 713/164 |
| 2004/0193488 A1 | 9/2004 | Khoo et al. |
| 2004/0193902 A1* | 9/2004 | Vogler .................... G06F 21/10 713/193 |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |

(56) References Cited

U.S. PATENT DOCUMENTS

| | | |
|---|---|---|
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021853 A1 | 1/2005 | Parekh et al. |
| 2005/0022019 A1* | 1/2005 | Medvinsky ............ G06F 21/10 726/4 |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0060264 A1 | 3/2005 | Schrock et al. |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091107 A1 | 4/2005 | Blum |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0107158 A1 | 5/2005 | Kanisawa et al. |
| 2005/0108095 A1 | 5/2005 | Perlmutter |
| 2005/0113170 A1 | 5/2005 | McHugh |
| 2005/0114526 A1 | 5/2005 | Aoyama |
| 2005/0125286 A1 | 6/2005 | Crippen et al. |
| 2005/0125528 A1 | 6/2005 | Burke et al. |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0149397 A1 | 7/2005 | Morgenstern et al. |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0177853 A1 | 8/2005 | Williams et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0202385 A1 | 9/2005 | Coward et al. |
| 2005/0203804 A1 | 9/2005 | Suzuki et al. |
| 2005/0203811 A1 | 9/2005 | David |
| 2005/0203849 A1 | 9/2005 | Benson |
| 2005/0204381 A1 | 9/2005 | Ludvig et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Altberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0240961 A1 | 10/2005 | Jerding et al. |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0254366 A1 | 11/2005 | Amar |
| 2005/0255914 A1 | 11/2005 | McHale et al. |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0273618 A1* | 12/2005 | Takemura ........ G11B 20/00086 713/182 |
| 2005/0283395 A1 | 12/2005 | Lesandrini et al. |
| 2005/0283401 A1 | 12/2005 | Swix et al. |
| 2005/0283797 A1 | 12/2005 | Eldering et al. |
| 2005/0286860 A1 | 12/2005 | Conklin |
| 2005/0288999 A1 | 12/2005 | Lerner et al. |
| 2006/0007312 A1 | 1/2006 | James |
| 2006/0031551 A1 | 2/2006 | Agresta et al. |
| 2006/0080702 A1 | 4/2006 | Diez et al. |
| 2006/0085517 A1 | 4/2006 | Kaurila |
| 2006/0085816 A1 | 4/2006 | Funk et al. |
| 2006/0090186 A1 | 4/2006 | Santangelo et al. |
| 2006/0130095 A1 | 6/2006 | Willis et al. |
| 2006/0135232 A1 | 6/2006 | Willis |
| 2006/0143650 A1 | 6/2006 | Tanikawa et al. |
| 2006/0150249 A1 | 7/2006 | Gassen et al. |
| 2006/0167747 A1 | 7/2006 | Goodman |
| 2006/0193471 A1 | 8/2006 | Stehle |
| 2006/0195859 A1 | 8/2006 | Konig et al. |
| 2006/0195860 A1 | 8/2006 | Eldering et al. |
| 2006/0195902 A1 | 8/2006 | King et al. |
| 2006/0212347 A1 | 9/2006 | Fang et al. |
| 2006/0212350 A1 | 9/2006 | Ellis et al. |
| 2006/0230141 A1 | 10/2006 | Willis |
| 2006/0242667 A1 | 10/2006 | Peterson et al. |
| 2006/0242703 A1 | 10/2006 | Abeni |
| 2006/0248209 A1 | 11/2006 | Chiu |
| 2006/0248569 A1 | 11/2006 | Lienhart et al. |

(56) References Cited

U.S. PATENT DOCUMENTS

| | | | |
|---|---|---|---|
| 2006/0248595 A1* | 11/2006 | Kelly | G11B 20/00086 726/27 |
| 2006/0253323 A1 | 11/2006 | Phan et al. | |
| 2006/0253330 A1 | 11/2006 | Maggio et al. | |
| 2006/0265503 A1 | 11/2006 | Jones et al. | |
| 2006/0268667 A1 | 11/2006 | Jellison, Jr. et al. | |
| 2006/0294566 A1 | 12/2006 | Zlattner | |
| 2007/0027771 A1 | 2/2007 | Collins et al. | |
| 2007/0038508 A1 | 2/2007 | Jain et al. | |
| 2007/0038516 A1 | 2/2007 | Apple et al. | |
| 2007/0038931 A1 | 2/2007 | Allaire et al. | |
| 2007/0050254 A1 | 3/2007 | Driscoll | |
| 2007/0050256 A1 | 3/2007 | Walker et al. | |
| 2007/0055980 A1 | 3/2007 | Mageid et al. | |
| 2007/0061204 A1 | 3/2007 | Ellis et al. | |
| 2007/0061838 A1 | 3/2007 | Grubbs et al. | |
| 2007/0066287 A1 | 3/2007 | Papulov | |
| 2007/0072676 A1 | 3/2007 | Baluja | |
| 2007/0073756 A1 | 3/2007 | Manhas et al. | |
| 2007/0078706 A1 | 4/2007 | Datta et al. | |
| 2007/0078712 A1 | 4/2007 | Ott et al. | |
| 2007/0078714 A1 | 4/2007 | Ott | |
| 2007/0078989 A1 | 4/2007 | van Datta | |
| 2007/0079326 A1 | 4/2007 | Datta | |
| 2007/0079331 A1 | 4/2007 | Datta | |
| 2007/0079335 A1 | 4/2007 | McDonough | |
| 2007/0083611 A1 | 4/2007 | Farago et al. | |
| 2007/0089151 A1 | 4/2007 | Moore et al. | |
| 2007/0094081 A1 | 4/2007 | Yruski | |
| 2007/0094082 A1 | 4/2007 | Yruski | |
| 2007/0094083 A1 | 4/2007 | Yruski | |
| 2007/0094363 A1 | 4/2007 | Yruski | |
| 2007/0101360 A1 | 5/2007 | Gutta et al. | |
| 2007/0118425 A1 | 5/2007 | Yruski | |
| 2007/0130012 A1 | 6/2007 | Yruski | |
| 2007/0130594 A1 | 6/2007 | Hidary et al. | |
| 2007/0146812 A1 | 6/2007 | Lawton | |
| 2007/0150919 A1 | 6/2007 | Morishita | |
| 2007/0162945 A1 | 7/2007 | Mills | |
| 2007/0168288 A1 | 7/2007 | Bozeman | |
| 2007/0174471 A1 | 7/2007 | Van Rossum | |
| 2007/0244760 A1 | 10/2007 | Bodnar et al. | |
| 2007/0294740 A1 | 12/2007 | Drake et al. | |
| 2007/0294773 A1 | 12/2007 | Hydrie et al. | |
| 2007/0299935 A1 | 12/2007 | Plastina et al. | |
| 2008/0046948 A1 | 2/2008 | Verosub | |
| 2008/0097872 A1 | 4/2008 | Peckover | |
| 2008/0102947 A1 | 5/2008 | Hays et al. | |
| 2008/0104106 A1 | 5/2008 | Rosenberg et al. | |
| 2008/0109844 A1 | 5/2008 | Baldeschwieler et al. | |
| 2008/0114861 A1 | 5/2008 | Gildred | |
| 2008/0120407 A1 | 5/2008 | Chen et al. | |
| 2008/0127244 A1 | 5/2008 | Zhang | |
| 2008/0140239 A1 | 6/2008 | Rosenberg et al. | |
| 2008/0140717 A1 | 6/2008 | Rosenberg et al. | |
| 2008/0141372 A1 | 6/2008 | Massey et al. | |
| 2008/0207137 A1 | 8/2008 | Maharajh et al. | |
| 2009/0083788 A1 | 3/2009 | Russell | |
| 2009/0183081 A1 | 7/2009 | Rodriguez | |
| 2009/0204481 A1 | 8/2009 | Navar | |
| 2009/0254430 A1 | 10/2009 | Cherenson | |
| 2010/0022310 A1 | 1/2010 | van Datta | |
| 2010/0030640 A1 | 2/2010 | van Datta | |
| 2010/0043022 A1 | 2/2010 | Kaftan | |
| 2010/0169910 A1 | 7/2010 | Collins et al. | |
| 2010/0269138 A1 | 10/2010 | Krikorian et al. | |
| 2011/0004669 A1 | 1/2011 | Navar | |
| 2011/0010545 A1 | 1/2011 | Kill et al. | |
| 2011/0015975 A1 | 1/2011 | Yruski et al. | |
| 2011/0029383 A1 | 2/2011 | Engel et al. | |
| 2011/0041161 A1 | 2/2011 | Capati | |
| 2011/0125582 A1 | 5/2011 | Datta et al. | |
| 2011/0138058 A1 | 6/2011 | Ishida | |
| 2011/0307339 A1 | 12/2011 | Russell | |
| 2013/0232000 A1 | 9/2013 | Van Datta | |
| 2013/0232001 A1 | 9/2013 | Van Datta | |
| 2013/0297411 A1 | 11/2013 | Van Datta | |
| 2014/0019229 A1 | 1/2014 | Van Datta | |
| 2014/0019249 A1 | 1/2014 | Nicholas et al. | |
| 2014/0089081 A1 | 3/2014 | Yruski | |
| 2014/0304328 A1 | 10/2014 | Capati | |
| 2014/0324576 A1 | 10/2014 | van Datta | |
| 2014/0337882 A1 | 11/2014 | Navar | |

FOREIGN PATENT DOCUMENTS

| | | |
|---|---|---|
| CA | 2250680 A1 * | 4/2000 |
| CN | 1653819 | 8/2005 |
| CN | 103279874 | 9/2013 |
| EP | 0 337 539 | 10/1989 |
| EP | 0 405 776 | 1/1991 |
| EP | 0 620 688 | 10/1994 |
| EP | 0 625 760 | 11/1994 |
| EP | 0 743 595 | 10/1996 |
| EP | 0 905 928 | 3/1999 |
| GB | 2 141 907 | 1/1985 |
| GB | 2 194 369 | 3/1988 |
| JP | 12-20925 | 9/1989 |
| JP | 63-35569 | 12/1994 |
| JP | 81-17445 | 5/1996 |
| JP | 81-73634 | 7/1996 |
| JP | 82-80934 | 10/1996 |
| JP | 2001-111921 | 4/2001 |
| JP | 2001-321556 | 11/2001 |
| JP | 2002-366971 | 12/2002 |
| JP | 2003-248844 | 9/2003 |
| JP | 2004-102475 | 4/2004 |
| JP | 2004-298469 | 10/2004 |
| WO | WO 93/14462 | 7/1993 |
| WO | WO 93/19427 | 9/1993 |
| WO | WO 93/22017 | 11/1993 |
| WO | WO 93/23125 | 11/1993 |
| WO | WO 95/12442 | 5/1995 |
| WO | WO 95/12853 | 5/1995 |
| WO | WO 98/51384 | 11/1998 |
| WO | WO 03/032127 | 4/2003 |
| WO | WO 2004/100010 | 11/2004 |
| WO | WO 2005/086969 | 9/2005 |
| WO | WO 2007/041022 | 4/2007 |
| WO | WO 2007/041028 | 4/2007 |
| WO | WO 2007/130681 | 11/2007 |

OTHER PUBLICATIONS

U.S. Appl. No. 11/586,990 Final Office Action mailed Dec. 8, 2014.
U.S. Appl. No. 11/586,990 Office Action mailed Aug. 12, 2014.
U.S. Appl. No. 11/588,036 Office Action mailed Jan. 15, 2015.
U.S. Appl. No. 11/586,958 Office Action mailed Jan. 14, 2015.
U.S. Appl. No. 11/586,959 Final Office Action mailed Dec. 8, 2014.
U.S. Appl. No. 13/857,080 Office Action mailed Apr. 29, 2015.
U.S. Appl. No. 13/857,082 Office Action mailed Apr. 16, 2015.
U.S. Appl. No. 11/452,848 Final Office Action mailed Apr. 7, 2015.
U.S. Appl. No. 14/028,327 Final Office Action mailed Mar. 19, 2015.
U.S. Appl. No. 14/308,313 Office Action mailed Apr. 27, 2015.
U.S. Appl. No. 14/091,327 Office Action mailed Mar. 12, 2015.
U.S. Appl. No. 14/315,694 Office Action mailed Apr. 10, 2015.
U.S. Appl. No. 12/703,188 Office Action mailed Apr. 1, 2015.
U.S. Appl. No. 11/586,959 Office Action mailed Jul. 9, 2015.
U.S. Appl. No. 13/013,789 Final Office Action mailed Jul. 28, 2014.
U.S. Appl. No. 11/586,959 Final Office Action mailed Jul. 31, 2014.
U.S. Appl. No. 12/703,188 Final Office Action mailed Jul. 14, 2014.
Andreaux. J.-P.; Copy Protection system for digital home networks; Mar. 2004; IEEE, vol. 21, Issue: 2; pp. 100-108.
Business Wire, "Juno launches America's first free Internet e-mail service; Initial advertisers include Land's End, Miramax and Snapple," Apr. 19, 1996.
Business Wire, "RTIME Announces First 100-Person Twitch Game for Internet; "RTIME Rocks!" Demonstrates the Power of the RTIME Interactive Networking Engine to Support Large Scale, High Performance, Internet Game Play," Apr. 14, 1997.

(56) References Cited

OTHER PUBLICATIONS

Cohen, Josh, "A General Overview of Two New Technologies for Playing Protected Content on Portable or Networked Devices," Microsoft Windows Media, Jun. 2004, 1-8.
Courtois N et al: An Algebraic Masking Method to Protect AES Agaist Power Attacks, 'Online! XP002344150 Retrieved from the Internet: URL:eprint.iacr.org/2005/204.pdf> 'retrieved on Sep. 8, 2005!.
Fontijn, Willem; AmbientDB: P2P Data Management Middleware for Ambient Intelliegence; Year: 2004; IEEE; pp: 1-5.
Microsoft Corporation, "A Technical Overview of Windows Media DRM 10 for Devices," Microsoft Windows Media, Sep. 2004, 1-16.
Microsoft Corporation, "Architecture of Windows Media Rights Manager," www.microsoft.com/windows/windowsmedia/howto/articles/drmarchitecture.aspc, May 2004.
PricewaterhouseCoopers, "Lab Online Ad Measurement Study," Dec. 2001.
Recording Industry Association of America, "Frequently Asked Questions—Webcasting," www.riaa.com/issues/licensing/webcasting_faq.asp. (acc. 2004).
Statement in Accordance with the Notice from the European Patent Office dated Oct. 1, 2007 Concerning Business Methods Nov. 1, 2007, XP002456252.
U.S. Copyright Office, "The Digital Millennium Copyright Act of 1998," Oct. 1998, 1-18.
What TV Ratings Really Mean (And Other Frequently-Asked Questions). Nielsen Media Research. Web. <http:/ documents. chelmsford. k 12. ma.us/dsweb/GeUDocument-14983/nielsenmedia.htm>, Jun. 2005.
PCT/US06/037018, International Search Report and Written Opinion mailed Aug. 7, 2007.
PCT/US06/036958, International Search Report and Written Opinion mailed Apr. 27, 2007.
PCT/US07/11059, International Search Report and Written Opinion mailed May 30, 2008.
JP 2009-509786, Decision of Refusal mailed Oct. 30, 2012.
JP 2009-509786, Decision of Refusal mailed Aug. 2, 2011.
JP 2009-509786, Decision of Refusal mailed Jul. 28, 2011.
JP 2013-039681, Notification of Reason for Refusal mailed Feb. 12, 2014.
CN 200780016268.2, First Office Action mailed Jan. 4, 2012.
U.S. Appl. No. 11/241,229 Final Office Action mailed Apr. 23, 2010.
U.S. Appl. No. 11/241,229 Office Action mailed Nov. 19, 2009.
U.S. Appl. No. 13/939,178 Office Action mailed Oct. 10, 2013.
U.S. Appl. No. 12/571,204 Office Action mailed Feb. 28, 2012.
U.S. Appl. No. 12/571,225 Office Action mailed Feb. 2, 2012.
U.S. Appl. No. 11/240,655 Final Office Action mailed Nov. 14, 2013.
U.S. Appl. No. 11/240,655 Office Action mailed Aug. 5, 2013.
U.S. Appl. No. 11/240,655 Final Office Action mailed Jan. 27, 2010.
U.S. Appl. No. 11/240,655 Office Action mailed Apr. 16, 2009.
U.S. Appl. No. 12/190,323 Final Office Action mailed Feb. 25, 2013.
U.S. Appl. No. 12/190,323 Office Action mailed May 7, 2012.
U.S. Appl. No. 12/190,323 Office Action mailed Jun. 8, 2011.
U.S. Appl. No. 12/190,323 Final Office Action mailed Nov. 14, 2011.
U.S. Appl. No. 13/191,398 Office Action mailed Dec. 3, 2013.
U.S. Appl. No. 13/191,398 Final Office Action mailed Jun. 7, 2013.
U.S. Appl. No. 13/191,398 Office Action mailed Mar. 22, 2012.
U.S. Appl. No. 11/535,370 Final Office Action mailed Jun. 8, 2010.
U.S. Appl. No. 11/535,307 Office Action mailed Dec. 10, 2009.
U.S. Appl. No. 11/535,307 Final Action mailed Sep. 8, 2009.
U.S. Appl. No. 11/535,307 Office Action mailed Apr. 16, 2009.
U.S. Appl. No. 13/013,789 Office Action mailed Dec. 20, 2013.
U.S. Appl. No. 13/013,789 Final Office Action mailed Feb. 27, 2013.
U.S. Appl. No. 13/013,789 Office Action mailed Oct. 9, 2012.
U.S. Appl. No. 11/452,848 Office Action mailed Nov. 18, 2013.
U.S. Appl. No. 11/452,848 Final Office Action mailed Feb. 15, 2011.
U.S. Appl. No. 11/452,848 Office Action mailed Sep. 15, 2010.
U.S. Appl. No. 11/452,848 Final Office Action mailed Apr. 21, 2010.
U.S. Appl. No. 11/452,848 Office Action mailed Oct. 20, 2009.
U.S. Appl. No. 11/452,848 Final Office Action mailed Jul. 9, 2009.
U.S. Appl. No. 11/452,848 Office Action mailed Jan. 27, 2009.
U.S. Appl. No. 14/028,327 Office Action mailed Nov. 7, 2013.
U.S. Appl. No. 11/586,990 Final Office Action mailed Apr. 7, 2014.
U.S. Appl. No. 11/586,990 Office Action mailed Nov. 20, 2013.
U.S. Appl. No. 11/586,990 Final Office Action mailed Apr. 10, 2013.
U.S. Appl. No. 11/586,990 Office Action mailed Nov. 23, 2012.
U.S. Appl. No. 11/586,990 Final Office Action mailed Feb. 14, 2011.
U.S. Appl. No. 11/586,990 Office Action mailed Sep. 15, 2010.
U.S. Appl. No. 11/588,036 Office Action mailed Jan. 6, 2014.
U.S. Appl. No. 11/588,036 Final Office Action mailed Oct. 4, 2012.
U.S. Appl. No. 11/588,036 Office Action mailed Apr. 27, 2012.
U.S. Appl. No. 11/588,036 Final Office Action mailed Feb. 17, 2011.
U.S. Appl. No. 11/588,036 Office Action mailed Sep. 14, 2010.
U.S. Appl. No. 11/586,958 Final Office Action mailed Mar. 12, 2014.
U.S. Appl. No. 11/586,958 Office Action mailed Nov. 6, 2013.
U.S. Appl. No. 11/586,958 Final Office Action mailed Feb. 14, 2011.
U.S. Appl. No. 11/586,958 Office Action mailed Sep. 30, 2010.
U.S. Appl. No. 11/586,989 Final Office Action mailed Dec. 9, 2010.
U.S. Appl. No. 11/586,989 Office Action mailed May 11, 2010.
U.S. Appl. No. 11/586,989 Office Action mailed Mar. 30, 2009.
U.S. Appl. No. 11/586,959 Office Action mailed Feb. 12, 2014.
U.S. Appl. No. 11/586,959 Final Office Action mailed Aug. 30, 2013.
U.S. Appl. No. 11/586,959 Office Action mailed May 8, 2013.
U.S. Appl. No. 11/586,959 Final Office Action mailed Oct. 5, 2012.
U.S. Appl. No. 11/586,959 Office Action mailed Apr. 27, 2012.
U.S. Appl. No. 11/586,959 Final Office Action mailed Feb. 14, 2011.
U.S. Appl. No. 11/586,959 Office Action mailed Oct. 1, 2010.
U.S. Appl. No. 12/370,531 Office Action mailed Aug. 1, 2013.
U.S. Appl. No. 12/370,531 Final Office Action mailed Aug. 3, 2011.
U.S. Appl. No. 12/370,531 Office Action mailed Nov. 16, 2011.
U.S. Appl. No. 12/370,531 Final Office Action mailed Aug. 1, 2011.
U.S. Appl. No. 12/370,531 Office Action mailed Feb. 2, 2011.
U.S. Appl. No. 11/588,236 Office Action mailed Sep. 9, 2009.
U.S. Appl. No. 11/588,236 Office Action mailed Mar. 5, 2009.
U.S. Appl. No. 12/703,188 Office Action mailed Nov. 21, 2013.
U.S. Appl. No. 12/703,188 Final Office Action mailed Oct. 12, 2012.
U.S. Appl. No. 12/703,188 Office Action mailed Apr. 6, 2012.
U.S. Appl. No. 10/924,009 Supplemental Final Office Action mailed Feb. 4, 2009.
U.S. Appl. No. 10/924,009 Final Office Action mailed Dec. 5, 2008.
U.S. Appl. No. 10/924,009 Office Action mailed Jun. 30, 2008.
U.S. Appl. No. 12/717,108 Final Office Action mailed Jan. 31, 2012.
U.S. Appl. No. 12/717,108 Final Office Action mailed Jul. 20, 2011.
U.S. Appl. No. 12/717,108 Office Action mailed Feb. 9, 2011.
U.S. Appl. No. 12/782,678 Final Office Action mailed Jul. 31, 2013.
U.S. Appl. No. 12/782,678 Office Action mailed Jan. 7, 2013.
U.S. Appl. No. 12/782,678 Office Action mailed Oct. 4, 2012.
U.S. Appl. No. 11/452,848 Office Action mailed Oct. 23, 2014.
U.S. Appl. No. 14/028,327 Office Action mailed Oct. 8, 2014.
U.S. Appl. No. 13/191,398 Final Office Action mailed Jun. 10, 2014.
U.S. Appl. No. 11/452,848 Final Office Action mailed Jun. 5, 2014.
U.S. Appl. No. 14/028,327 Final Office Action mailed Jun. 9, 2014.
U.S. Appl. No. 11/588,036 Final Office Action mailed Apr. 15, 2014.
JP 2013-039681, Decision of Refusal dated Feb. 3, 2015.
CN 201310051520.0, First Office Action mailed Sep. 1, 2015.
U.S. Appl. No. 13/857,080 Final Office Action mailed Aug. 19, 2015.
U.S. Appl. No. 13/857,082 Final Office Action mailed Aug. 11, 2015.
U.S. Appl. No. 11/588,036 Final Office Action mailed Aug. 4, 2015.

(56) References Cited

OTHER PUBLICATIONS

U.S. Appl. No. 11/586,958 Final Office Action mailed Aug. 4, 2015.
U.S. Appl. No. 14/691,404 Office Action mailed Nov. 13, 2015.
U.S. Appl. No. 14/308,313 Final Office Action mailed Oct. 23, 2015.
U.S. Appl. No. 14/315,694 Final Office Action mailed Oct. 27, 2015.
EP 06815173.7, First Examination Report mailed Feb. 23, 2016.
U.S. Appl. No. 14/336,452 Office Action mailed Jan. 8, 2016.
U.S. Appl. No. 14/691,404 Final Office Action mailed Mar. 25, 2016.
U.S. Appl. No. 13/013,789 Office Action mailed Feb. 12, 2016.
U.S. Appl. No. 11/586,990 Office Action mailed Mar. 18, 2016.
U.S. Appl. No. 11/586,959 Final Office Action mailed Jan. 29, 2016.
U.S. Appl. No. 14/315,694 Office Action mailed Mar. 25, 2016.
U.S. Appl. No. 12/703,188 Final Office Action mailed Apr. 1, 2016.
U.S. Appl. No. 13/013,789 Final Office Action mailed Jun. 17, 2016.
U.S. Appl. No. 11/586,958 Office Action mailed Jun. 23, 2016.
U.S. Appl. No. 13/857,080 Office Action mailed Aug. 2, 2016.
U.S. Appl. No. 13/857,082 Office Action mailed Aug. 18, 2016.
U.S. Appl. No. 11/588,036 Office Action mailed Aug. 31, 2016.
U.S. Appl. No. 12/703,188 Final Office Action mailed Sep. 7, 2016.

\* cited by examiner

Playlist .xme file

| ver | Key 1 index | Key 2 index | Authent. Code | Play Rules | Pointer to .srnd | Pointer to .srnd | ● ● ● |

FIG. 5A

.log file

| ver | Key 1 index | Key 2 index | Authent. Code | Asset ID | Event ID | Time Stamp | Authent. Code | Asset ID | Event ID | Time Stamp | ● ● ● |

FIG. 5B

```
*********************
* DNN News
* Jazz Hits 1990's
* Rock & Pop Hits
* EBC Arkansas Today
* Reality Talk
*********************
```

FIG. 6B

```
*********************
* Play
* Record
* Radio Service
* Settings
*********************
```

FIG. 6A

\*\*\*\*\*\*\*\*\*\*\*\*\*\*\*\*\*\*\*
\*Jazz Hits 1990's
\*Louis Armstrong
\*It's a Good Life
\*Greatest Hits
\*
\*\*\*\*\*\*\*\*\*\*\*\*\*\*\*\*\*\*\*\*\*\*

FIG. 6C

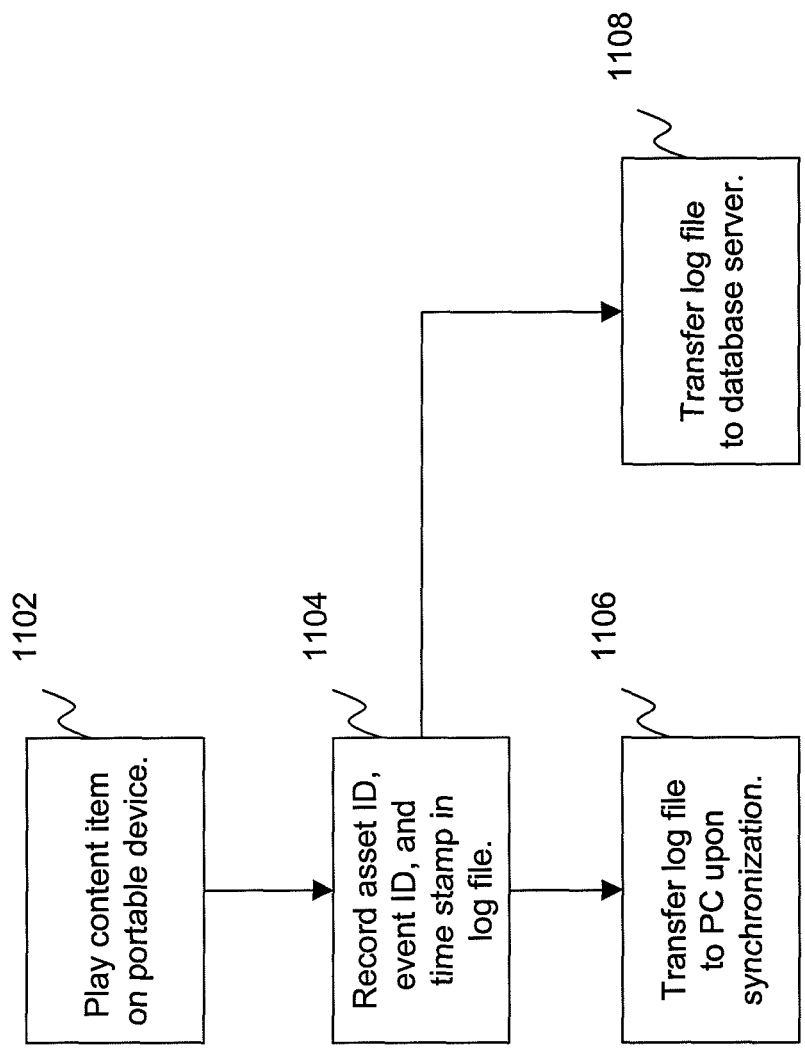

Prior Art DMCA Streaming

DMCA Streaming Using Restricted Media Playback Client

STATUTORY LICENSE RESTRICTED DIGITAL MEDIA PLAYBACK ON PORTABLE DEVICES

CROSS-REFERENCE TO RELATED APPLICATIONS

The present application is a continuation and claims the priority benefit of U.S. patent application Ser. No. 12/717,108 filed Mar. 3, 2010, which is a continuation and claims the priority benefit of U.S. patent application Ser. No. 10/924,009 filed Aug. 23, 2004, the disclosures of which are incorporated herein by reference.

The present application is related to U.S. patent application Ser. No. 10/717,183 and U.S. patent application Ser. No. 10/717,176, now U.S. Pat. No. 8,239,446, both filed on Nov. 19, 2003, the disclosures of which are incorporated herein by reference.

BACKGROUND OF THE INVENTION

Field of the Invention

The present invention is related to digital media and more particularly, in certain embodiments, to systems and methods for presenting digital media to a user.

Improvements in processor speed, digital storage capacity, and network bandwidth have enabled remarkable advances in the consumer audio experience. Examples of this include the advent of services that allow music to be purchased online and maintained on user personal computers, as well as the development of portable MP3 players that allow users to carry their favorite songs anywhere they are. Audio playback capability is also being incorporated into devices such as PDAs and cellphones. Users can populate their MP3 players with songs from their own personal CD library and may also incorporate music purchased from the previously mentioned online services.

To suitably restrict distribution of content that has been purchased online, many current MP3 players incorporate digital rights management (DRM) capabilities. Such content is typically encrypted with a key that is specific to a particular MP3 player. The user can select the individual song on the player and, in response, the player will decrypt the selected song using the player-specific key. The content cannot, however, be played on a different player.

A new type of audio content service is now envisioned where a user subscribes to particular "channels" on his or her personal computer. The channel content is periodically refreshed over a distribution network. A portable player can receive the periodically refreshed content from a personal computer it docks to, or possibly directly from the distribution network. The service has the advantage that the user can simply select the type of content that he or she is interested in without the need to identify particular albums and/or songs. The user experience is much more akin to that of radio. The service is also very useful in presenting news and sports information.

This new type of service needs to be accommodated to the rights of content owners. An advantage is that the service can take advantage of a lower cost so-called "statutory" content license that is typically significantly less expensive than outright purchase of an unlimited right to play the song on the user's computer or portable device. By the provisions of the Digital Millennium Copyright Act, the statutory license is available on a per-song basis to streaming music services.

FIG. 12A shows a typical arrangement for DMCA streaming of content subject to a statutory license. A central streaming server 1202 stores the content and provides real-time access over the Internet. Server 1202 stores one or more playlists, playlists being ordered sequences of digital media content items such as songs. A media content player 1204, such as, e.g., Windows Media Player, Real Player, etc. is running on a client device such as a personal computer.

Such a statutory license places certain restrictions on content play. For example, there are limitations on how often a song can be repeated, how often songs of a particular album can be repeated, how often songs by a particular artist can be repeated, how long a stream should play before repeating, etc. Also, individual sound recordings may not be played within one hour of a request by a listener or at a time specifically designated by the listener. Streaming server 1202 enforces these restrictions by structuring its playlists appropriately and limiting user access to individual songs and information about the ordering of playlists. Streaming server 1202 also tracks content play to calculate the statutory royalty due to the rights holder.

It is desired to make DMCA statutory content available on a portable device such as an MP3 player by way of the new audio content service described above. At the time of playback, the portable device will be entirely under the control of the user and the streaming server will be unable to enforce restrictions in real-time. For example, normally, an MP3 player provides the capability to skip songs, but if this function is used in an unlimited way, the DMCA restrictions may be violated. Also, to prevent content restrictions from being easily circumvented, it will be necessary to somehow lock out user access to individual songs. It will further be necessary to securely log which songs have been played and aggregate this information across users for royalty calculation purposes.

What are needed are systems and methods for providing the above-described channel-based audio service on a portable device while assuring that the conditions of a statutory license under the DMCA are met.

SUMMARY OF THE PRESENTLY CLAIMED INVENTION

Embodiments of the present invention provide systems and methods for, e.g., providing a statutory audio content service on a portable device that complies with the provisions of the Digital Millennium Copyright Act (DMCA). The user can select a playlist subject to DMCA restrictions but cannot access individual items. Content playback including skipping of content is restricted to enforce relevant DMCA provisions. Encryption used to implement digital rights management (DRM) may be modified to enforce such content play rules or, alternatively, an additional layer of encryption may be imposed. Limitations on playback are stored along with the playlist structure in a form that is protected against modification. Information logging content playback is maintained in protected form to be uploaded and relayed to the service provider for the purpose of calculating royalty payments.

Further understanding of the nature and advantages of the inventions herein may be realized by reference to the remaining portions of the specification and the attached drawings.

BRIEF DESCRIPTION OF THE DRAWINGS

FIG. 5A depicts a data structure representing a playlist according to one embodiment of the present invention.

FIG. 5B depicts a data structure representing a log of user activity according to one embodiment of the present invention.

FIGS. 6A-6C depict elements of a portable device user interface according to one embodiment of the present invention.

FIG. 11 is a flowchart describing steps of logging content play on a portable device according to one embodiment of the present invention.

DETAILED DESCRIPTION

Introduction

Embodiments of the present invention provide systems and methods for playback of DMCA statutory content. Such content may be played back on non-networked media players such as portable media players. A specific application to audio media materials and channel-based content is disclosed but it will be appreciated that other embodiments of the present invention will provide a user interface to video materials or other media.

A specific implementation of the present invention to be described operates in the context of an audio content distribution service. User interfaces of the present invention exploit a variety of systems and devices. Preferably, an appropriately configured personal computer, referred to herein as a "station," is used for management and organization of content, retrieval of content via a network, rights management and enforcement, recording, etc. Playback of content may be done via either the station or a portable device such as MP3 player, PDA, smartphone, car audio system, etc.

Figure 1:
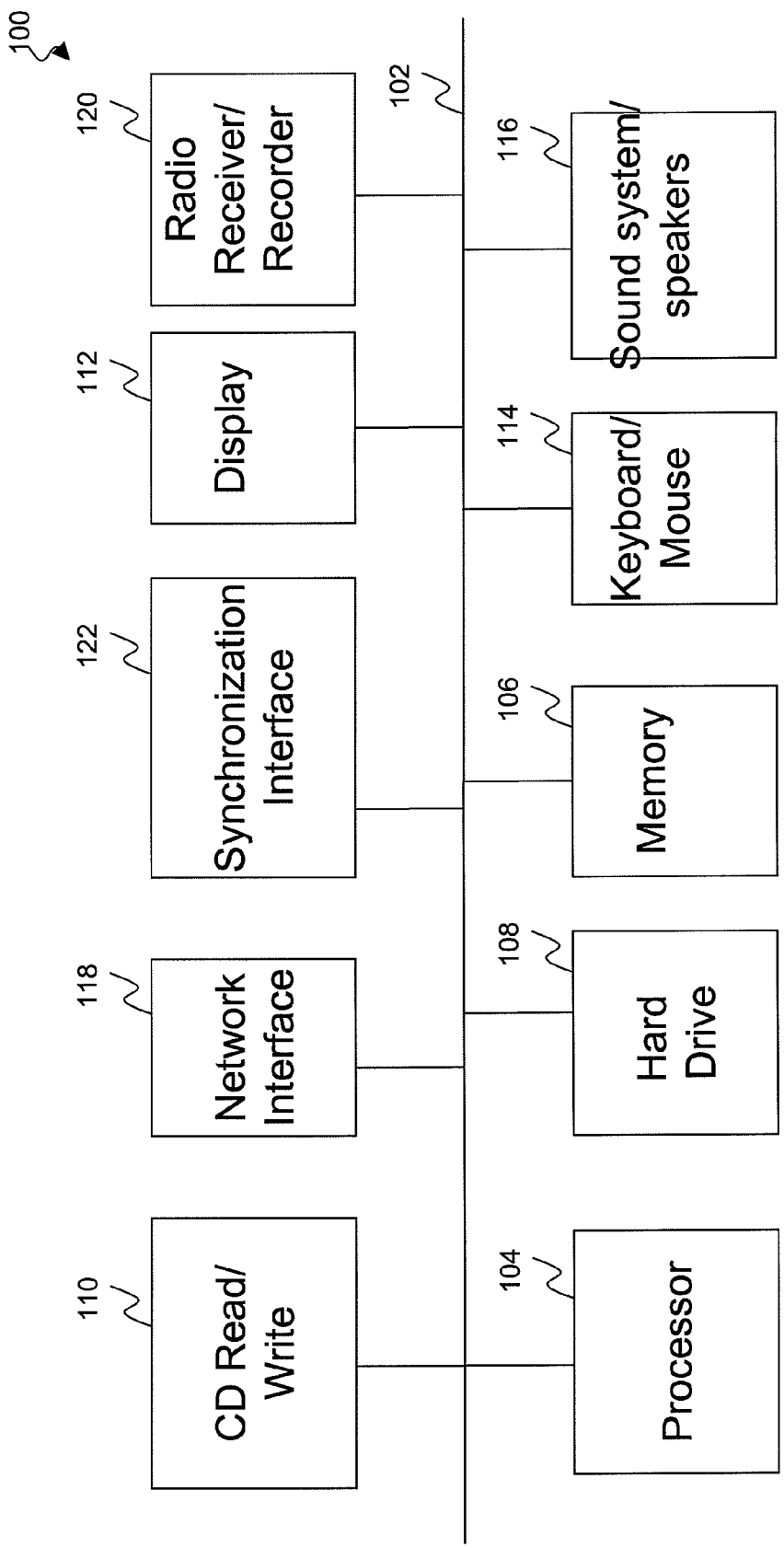
FIG. 1 depicts elements of a computer system according to one embodiment of the present invention.

FIG. 1 depicts elements of a representative personal computer 100 serving as a station according to one embodiments of the present invention. Personal computer 100 may be a laptop computer, desktop computer, etc. The various elements are depicted as being interconnected by a bus 102. However, it will be understood that the actual interconnections among the various elements of a modern personal computer are more complex. Further bus details are not presented because they are not germane to the operation of the present invention. Also, it will be appreciated that various elements may be either inside the computer's structure, outside the computer's structure, or implemented by elements both inside and outside the computer body.

Computer 100 incorporates basic elements such as a processor 104, a memory 106, a hard drive 108, and a CD read/write player 110. Processor 104 typically executes instructions stored in memory 106. The instructions perform the functions of the present invention. Longer term storage of instructions may be on hard drive 108, on a CD accessed through player 110, on other media such as a DVD-ROM, etc. Another example of a computer-readable medium that carries the instructions may be a signal received over a network, i.e., downloading of software.

Another key role of the various memory and storage devices is to store content to be played upon command. For example, audio content may be cached on hard drive 108 and loaded into memory 106 while being played.

Computer 100 also includes various elements to interact with the user. There is a display 112, a keyboard/mouse 114, and sound system/speakers 116. Display 112 and keyboard/mouse 114 facilitate customization and selection of content. Sound system/speakers 116 allow playing of user audio content at the station.

Computer 100 can obtain content in many different ways. For example, content may be remotely retrieved from a network via a network interface 118. Network interface 118 may incorporate one or more of, e.g., an Ethernet interface, DSL modem, cable modem, fiber optic transceiver, wireless modem, etc. Content may also be retrieved from a CD inserted in player 110 or from other media inserted in an appropriate peripheral device. Audio material may also be captured via a radio receiver/recorder 120. Radio receiver/recorder 120 may include capabilities for reception of e.g., conventional or digital AM/FM, conventional or digital shortwave, digital satellite, TV audio, etc. To ameliorate the impact of electromagnetic interference, radio receiver/recorder 120 is preferably located outside the body of computer 100.

Audio content that has been organized and collected on computer 100 may also be transferred to another device for more convenient listening. Accordingly, computer 100 is equipped with a synchronization interface 122. Via synchronization interface 122, selected audio content may be transferred to another device. Also, user selections such as ratings of content, purchase orders for content, may be transferred back to computer 100 for relaying to the content publisher. Synchronization interface 122, may be, e.g., a USB interface, wireless interface such as a Bluetooth interface, etc. Synchronization may alternatively occur across a network by employing network interface 118. For example, synchronization may occur via an IEEE 802.11 network or link, or across the Internet. In one implementation, the transfer of information during synchronization is in accordance with the Microsoft Media Transfer Protocol (MMTP™). Computer 100 may encrypt content prior to transfer to a portable device to restrict further distribution, and also, according to embodiments of the present invention, to enforce content playback restrictions as will be explained.

Figure 2:
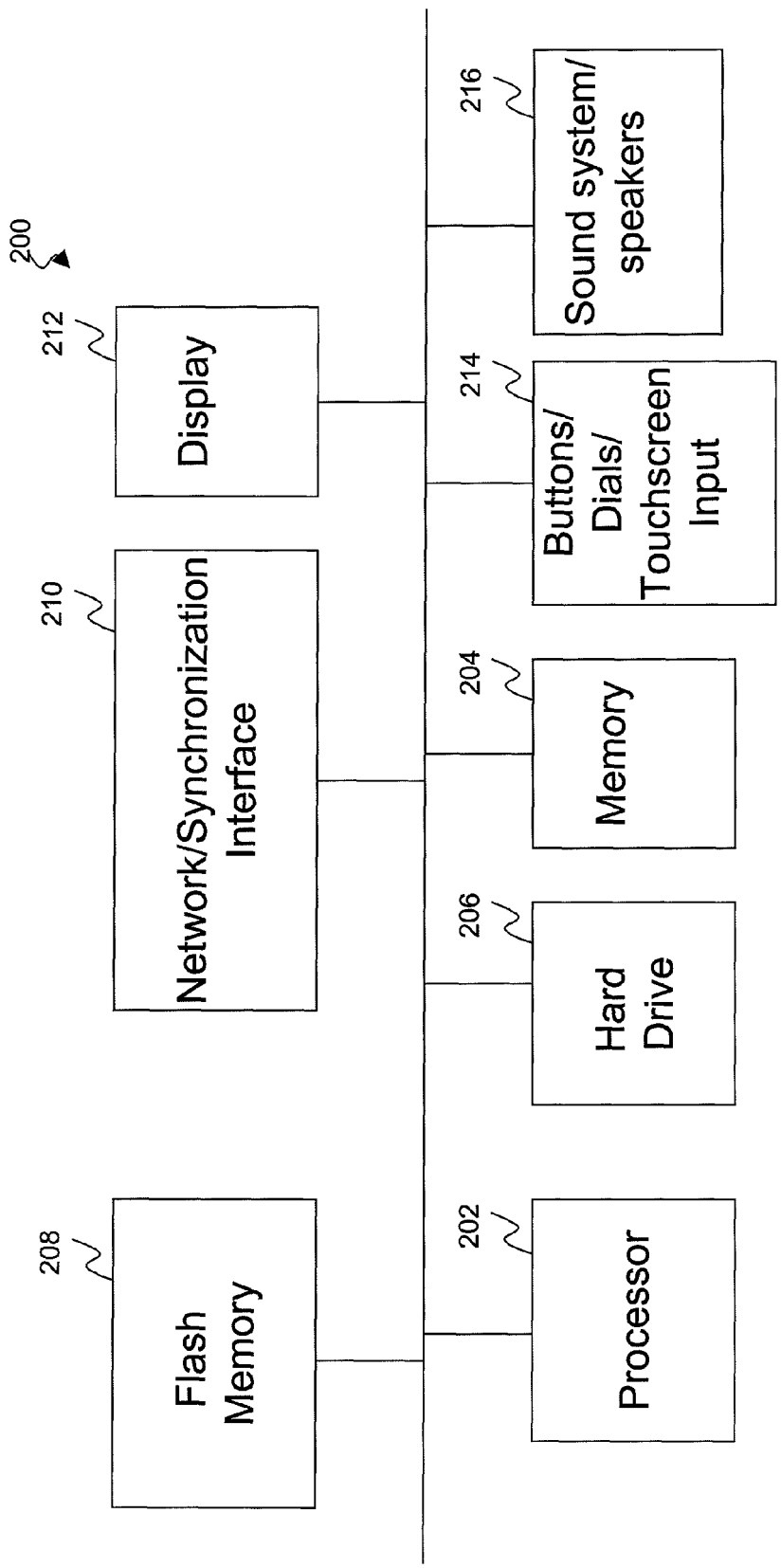
FIG. 2 depicts elements of a portable electronic device according to one embodiment of the present invention.

FIG. 2 depicts elements of a representative portable device 200 configured to implement embodiments of the present invention. Portable device 200 is, e.g., a smartphone, MP3 player, PDA, car audio device, etc. Thus many implementations, although not all, of portable device 200 are handheld. Not all of the depicted elements will necessarily be found in all of the device types. Depicted portable device 200 includes a processor 202, a memory 204, a hard drive 206, and a flash memory device 208. The various memory and storage devices can store instructions to be executed by processor 202 in the course of implementing functions of the present invention. Instructions can also be loaded via a network or other link to a computer or other device. Each of the various memory devices are also usable to store audio content. A portion of the available storage is used to store instructions and data related to rights management, encryption, playlist and log file authentication, etc. The instructions are typically microprocessor instructions (also referred to as "firmware"). These instructions and data are not readily modifiable by the user, thereby preventing circumvention of rights management schemes as described herein.

Software to implement the present invention may operate in the context of portable device operating system software. Examples of portable device operating software include, e.g., the Palm™ OS, Windows Mobile™, various types of Symbian™ operating system such as Series 60™, Series 80™, Series 90™, UIQ™, etc. Such operating system software is not necessary, however, and the invention may find application to less powerful devices such as, e.g., portable music players available from, e.g., Creative Labs, Rio, iRiver, Apple, Sony, etc.

Portable device 200 also includes a network/synchronization interface 210. Network/synchronization interface 210 may provide a short range link to computer 100 via, e.g., a USB connection, a wireless Bluetooth™ connection, a wireless 802.11 connection, etc. To implement a longer range synchronization link, there may be, e.g., a 2.5G or 3G cellular interface such as, e.g., GPRS, EDGE, CDMA2000, UMTS, 1xEV-DO, 1xEV-DV. These types of wireless interface may also be used to download audio content directly from a network.

The user interface features of the present invention exploit a display 212 and an input device 214 that can incorporate buttons, dials, a touchscreen, pen-based input, etc. Sounds system/speaker (or headphones) 216 play audio content and can also play audio cues for the user interface.

Figure 3:
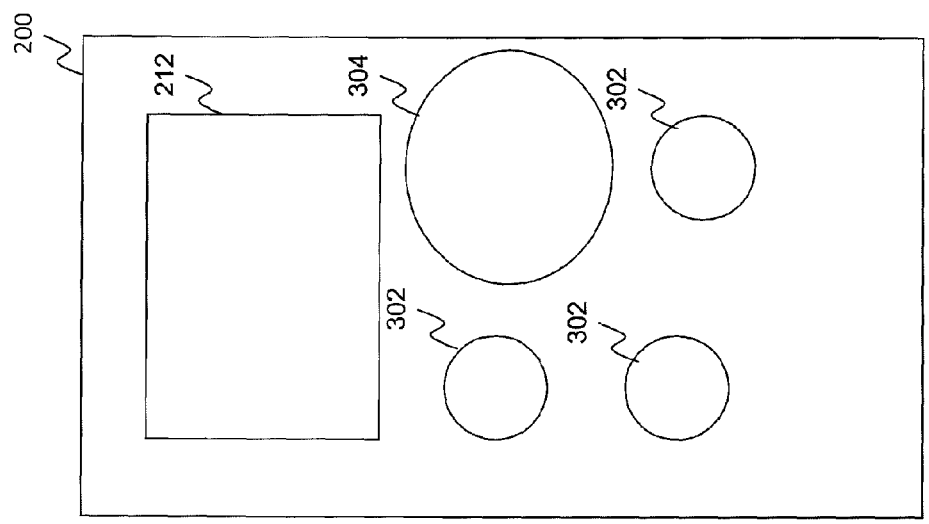
FIG. 3 depicts a physical arrangement of a portable electronic device according to one embodiment of the present invention.

FIG. 3 depicts a physical arrangement of some of the elements of FIG. 2 in a simplified representative portable device 200. Display 212 is positioned above a series of buttons 302 and a jog dial 304 that form a part of input device 214.

Channels

As has previously been mentioned, a "playlist" is an ordered sequence of digital media content. The term "channel" refers to the integration of a playlist and rules governing under what conditions content of that playlist is played back for a user. These conditions may include the DMCA statutory content restrictions and/or other restrictions relevant to the service provider business model. Some channels correspond to music genres and sub-genres. Other channels may include radio shows, news materials, etc.

It may be convenient to refer to the current contents of a channel as a playlist. It will be understood that the playlist may be modified as channel content is updated.

Portable Device Software Storage Architecture

In a preferred implementation, portable device 200 supports playback of Windows Media Audio (WMA) 9 format. Portable device 200 also then supports the Windows Media DRM 10 scheme as specified by Microsoft. Software operating on computer 100 will be able to discover content relevant to the audio content service on portable device 200. The synchronization process will delete old content before adding new content to prevent clutter and avoid the need for the user to specifically delete content.

Channel content is transferred from computer 100 to portable device 200 at time of synchronization. The user specifies which channels are to have their content transferred upon a synchronization. Memory constraints on portable device 200 may, however, lead to certain channels not being transferred or to paring of channel content prior to transfer.

Figure 4:
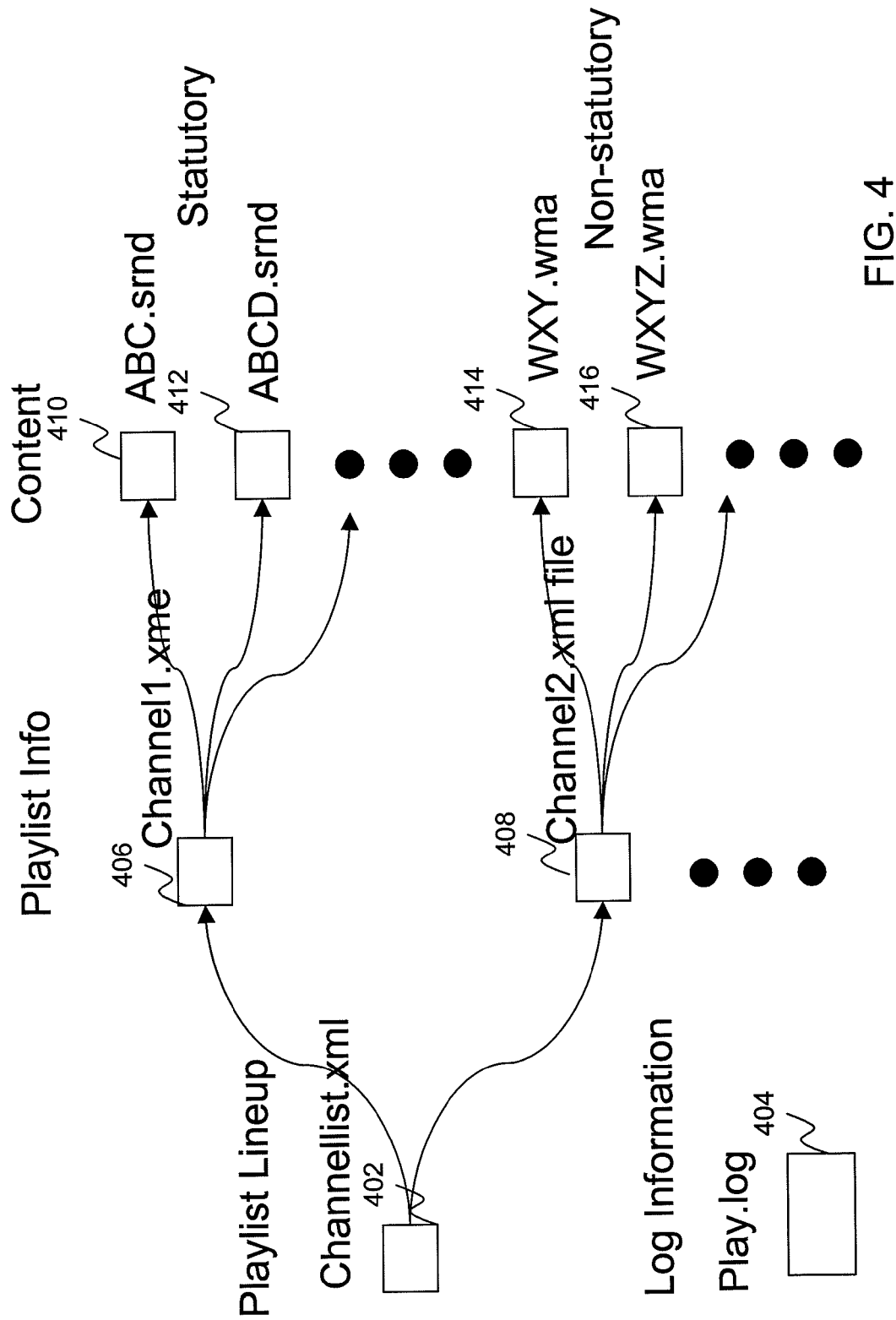
FIG. 4 depicts a content storage architecture for a portable device according to one embodiment of the present invention.

FIG. 4 depicts data structures used for content storage on portable device 200 according to one embodiment of the present invention. The data structure arrangement of FIG. 4 is only one example and the present invention is able to exploit a wide range of content storage schemes. A playlist lineup file 402 holds a list of available channels (playlists) for the audio content service. There is also a log file 404 that tracks which content has been played and may also log other user interactions such as requests for outright purchase of particular content items. The playback log information is important in assessing royalty payments that are due to be made by the service provider to rights holders. Accordingly, log file 404 is maintained in a protected form, as will be discussed, to assure that it is not corrupted by tampering.

Playlist lineup file 402 points to individual playlist files such as a playlist file 406 and a playlist file 408. Playlist file 406 is labeled as "Channel1.xme" and identifies music that is available under a DMCA statutory content license. Playlist file 406 is protected in a special way as will be discussed. Playlist file 408 is labeled as "Channel2.xml" and identifies content that is subject to conventional digital rights management but is not subject to DMCA statutory content license rules.

Playlist file 406 points to statutory content files such as files 410 ("ABC.srnd") and 412 ("ABCD.srnd"). Each of these files includes an audio content item such as a song, encrypted in a special way to facilitate enforcement of DMCA statutory content license rules. Playlist file 408 points to non-statutory content files 414 and 416. These files "WXY.wma" and "WXYZ.wma" are conventional .wma files whose encoding and encryption are specified by the Windows DRM 10 scheme. The .srnd files employ either a modification of the .wma encryption scheme or an extra layer of encryption.

FIG. 5A depicts further details of a statutory content playlist .xme file. The individual records are essentially pointers to the .srnd files of the songs belonging to the playlist. Another field includes rules that specify constraints on playing back the content. These may include the DMCA rules as discussed in further detail below. Other rules that may be specified, e.g., prevent the content from being looped more than e.g., 10 times, require deletion of the playlist and associated content after a specified elapsed time since the last synchronization, require deletion of the playlist and associated content after being looped e.g., 3 times, limit number of skips to e.g., 5 times per hour, require shuffling of songs in a channel after being looped, e.g., 3 times, etc. The inclusion of playback rules in the playlist file is a very powerful feature provided by embodiments of the present invention, allowing the service provider to flexibly control the user experience to accommodate both content rights management and the service provider's own business model.

In addition to the rights management encryption described below, the pointer information and rules are preferably encrypted by a suitable mathematical function to form an authentication code to prevent tampering with the playlist. In one implementation, the mathematical function is a hash function. This authentication code is maintained in a field of the playlist file. Authentication codes may also be computed for the individual records.

The playlist file includes two fields that hold key indices that identify keys in a key table stored in both station 100 and portable device 200. The key indices are used in the following way:

Encryption of the playlist file is based on a bitwise XOR of the file contents with a scrambling key. The scrambling key is generated from an XOR of 2 distinct keys that are chosen from a key table at random. The key table has n (e.g., between 5 and 20) hardcoded base keys. There are thus $n*(n-1)$ possible permutations of the keys. The XOR encryption scheme is symmetric. Encryption is done just prior to transferring the playlist file at synchronization.

Decryption is done in real-time when the playlist is selected, and at playback time. The key indices are retrieved and used to access the key table to obtain the two relevant base keys. The key table contents are specific to each portable device type. The key table is "burned into" the portable device at the time of manufacture, e.g., in a ROM. The base keys are XORed to obtain the scrambling key which is itself XORed with the playlist contents to decrypt them. The key indices are preceded by a version field which identifies the version number of the software used to generate the playlist file.

FIG. 5B depicts elements of a log information (.log) file according to one embodiment of the present invention. The same key table index scheme is used for encryption of the .log file. Authentication of the .log file is, however, on a per-record basis with each record incorporating an authentication code which may be a checksum, hash, etc. The authentication code is based on the record content and the record offset within the file. The records themselves store information about user interactions with the audio content service and playback events. Each record includes an Asset ID, an Event ID, and a time stamp. The Asset ID identifies a particular audio content item. The Event ID records the type of event being logged, e.g., playback of the audio content item, request for purchase, rating, etc. The time stamp records the time of the event.

In the currently discussed implementation, the encryption of the audio content items is based on the Windows DRM scheme. The non-statutory audio content items are encrypted using a symmetric encryption algorithm. The encryption/decryption key is the unique device serial number N, typically 16 or 20 bytes. The encryption occurs prior to transferring content to the device, and because of the use of N is specific to that portable device. The decryption occurs at playback time. The decryption process is implemented in firmware (microprocessor instructions) and is not accessible to the user. Thus the audio content item, once encrypted, cannot be played on a different portable device than the one for which the item was encrypted.

For statutory content a modified encryption scheme is used. In a first embodiment, the audio content item is encrypted with a pseudo-device serial number N' using the same algorithm employed by the Windows DRM scheme. N' is obtained from N using a suitable one-way function. When the audio content item is to be played, a modified one-way function is used to obtain N' from N. N' is only returned if the DMCA statutory content play rules are satisfied. N' is then used to decrypt the item for playback. If the rules are not satisfied then a NULL value is returned and decryption does not occur.

User Interface Elements

FIGS. 6A-6C depict displays shown by portable device 200 according to one embodiment of the present invention. FIG. 6A depicts an initial menu structure, showing options such as "play", "record", "radio service," "settings," etc. By selecting "radio service," one obtains the list of channels shown in FIG. 6B. The channels "DNN News," "EBC Arkansas Today," and "Reality Talk" incorporate non-statutory content. The channels "Jazz Hits 1990's" and "Rock and Pop Hits" incorporate statutory content.

Assuming one selects the channel "Jazz Hits 1990's," the display of FIG. 6C results. A first song in the corresponding playlist is being played. Portable device 200 preferably bookmarks the exit point of a channel when the user switches to another channel or stops listening for some other reason. Upon re-entry to that channel, the playback should begin at the bookmarked point. For non-music programs, playback begins exactly where it left off and for music channels it begins with the next song.

The display of FIG. 6C shows the title of the currently played channel, the artist name ("Louis Armstrong") of the currently played track, the title ("It's a good life") of the currently played track, the album title ("Greatest Hits") of the currently played track, and the play position within the track ("01:23").

The user can employ an appropriate button or other element of portable device 200 to request a skip but as will be explained this capability will be limited. The user can also switch between channels. An important aspect of the user interface for statutory content, however, is the functionality that is left out. The user has no visibility as to the identity of the audio content items on the playlist other than the ones that are being played. There is no ability to rewind, skip backward, or fast forward either within an audio content item or across audio content items. The ability to skip forward is limited.

The encryption and authentication features of the playlist file assure that these restrictions are not easily circumvented and that audio content items are not individually addressable.

Statutory Content Restrictions

The relevant DMCA statutory license restrictions are as follows:
1. Specific sound recordings may not be played within one hour of a request by a listener or at a time specifically designated by the listener.
2. In a three-hour period, no more than three tracks from a given album may be played.
3. In a three-hour period, no more than four tracks by a given artist or from a boxed set may be played.
4. No more than two tracks from a given album may be played consecutively.
5. No more than three tracks by a given artist or from a boxed set may be played consecutively.
6. A channel duration is at least three hours and may not be fully looped and played again until the user has listened for three hours.
7. A listener should not be aware of the songs contained in the channel, when the songs will be played or the order in which they will be played.
8. Archived programs (i.e., channels that always starts at the same place and that allows users to start at any time) must greater than 5 hours long and should not be available for more than two weeks at a time. For example, a 30 minute playlist with a fixed start cannot be made available for repeated play and a 6 hour playlist can be made available for repeated play, but not indefinitely.

Also, royalties should be paid to the rights holders based on the number of times their statutory content is played. To exploit the full legal rights for play on a portable device, rule 6 may be replaced by a rule that permits looping of the channel after 3 hours of elapsed time rather than playback time. This adaptation is particularly useful in situations where portable device memory limitations restrict storage of a statutory channel to less than three hours.

In one implementation, rules 1 and 7 are enforced by encryption and authentication of the playlist contents. Rules 2 through 5 are enforced by playlist ordering and the DMCA check function performed when decrypting audio content. Even without appropriate ordering or in a "shuffle" playback mode, the DMCA check function guarantees that these rules are enforced. Rule 6 is enforced by the playlist length and the DMCA check function. For playlists to which it applies, rule 8 is enforced by specifying within the playlist rule field that the playlist (although not necessarily individual content items) is to be deleted after two weeks. The deletion can be invoked as a result of applying the DMCA check function.

One embodiment of the present invention provides dynamic DMCA enforcement. Before playing a statutory audio content item, the DMCA check function is invoked. The DMCA check function involves consulting a playback history to verify whether playing that item would violate any of the DMCA constraints. Besides being logged in the log file, playback events are stored in chronological order separately for each playlist. Two indices are used to point to the head-end and tail-end of the list. Events between the head-end and a point representing three hours in the past are scanned to verify DMCA compliance. Events between the tail-end and the three hour point are periodically deleted by a clean-up procedure.

Other rules may be specified in the appropriate field of the playlist file. For example, when the total playback count of any audio content item in the channel exceeds an allowed number, portable device 200 will playback an audio clip that suggests the user should resynchronize with station 200 to refresh the channel with new content. Another rule can specify portable device 200 will stop playing the channel when there has been no synchronization for three or some other number of days. A further rule can specify that if every song has been played more than, e.g., ten times, the play of that channel will be stopped. Also, a rule can specify that content will be deleted after a specified time and date, such as Jan. 1, 2005 at 11:30 AM.

Other DMCA implementations enforce rules 2 through 5 by essentially never allowing skip. Dynamic DMCA has the advantage of allowing unlimited skips, if those skips do not cause the rules to be violated.

Procedures for Encrypting and Playing Content

Figure 12A:
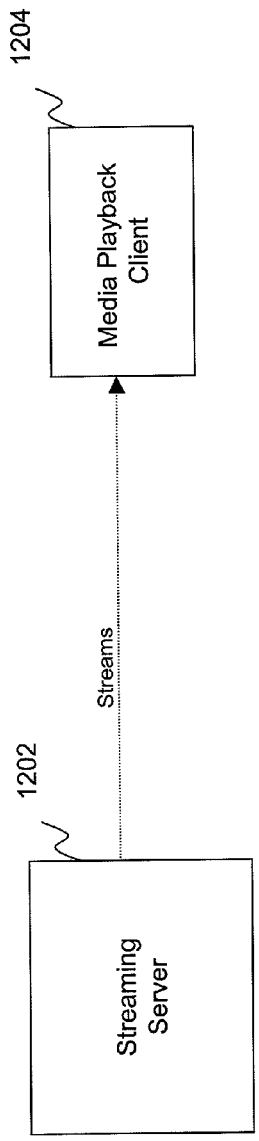
FIG. 12A depicts DMCA streaming from a streaming server according to the prior art.
Figure 12B:
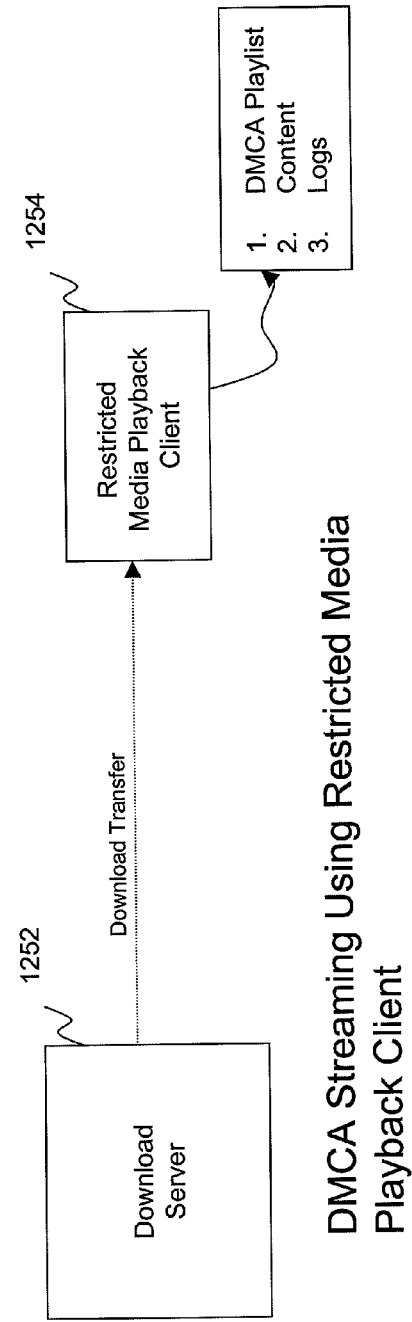
FIG. 12B depicts the application of a restricted media playback client according to one embodiment of the present invention.

FIG. 12B depicts statutory content distribution according to one embodiments of the present invention. Rather than employing a streaming server as in the prior art, a conventional download server 1252 stores channel content. The audio content is transferred in a non-streaming download to a restricted media playback client 1254. In one implementation, restricted media playback client 1254 operates on a handheld device. Also, a personal computer operating as a staging device may serve as a proxy for download server 1252. The transfer to restricted media playback client 1254 thus may be either by synchronization to the personal computer or by connection to download server 1252 via a network or other link.

Figure 7:
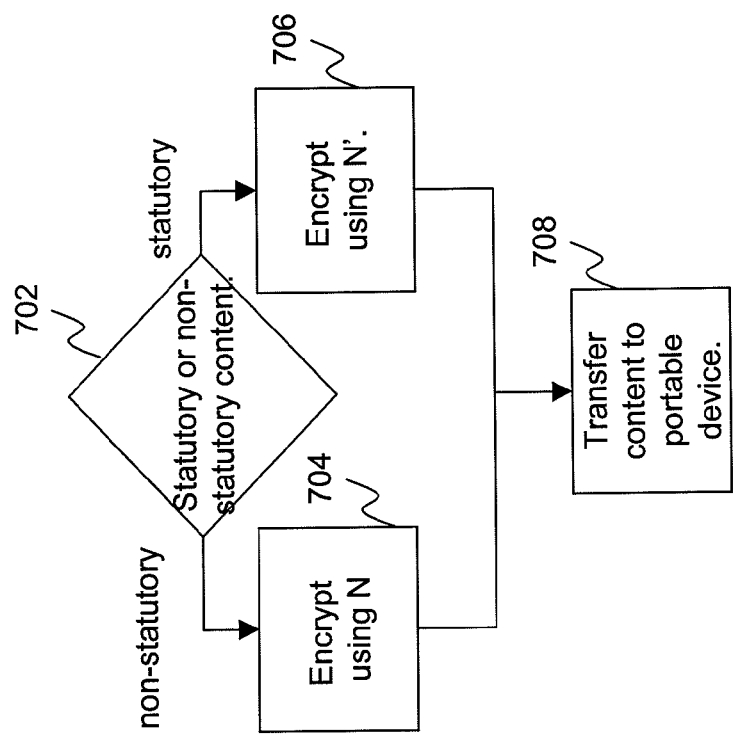
FIG. 7 is a flowchart describing steps of preparing audio content for transfer to a portable device according to a first embodiment of the present invention.

FIG. 7 is a flowchart describing steps of transferring content to the portable device according to one embodiment of the present invention. A step 702 determines wither the audio content item to be played is statutory or non-statutory. If the content is non-statutory, it is encrypted at step 704 in accordance with the Windows Media DRM procedure using the device serial number N as a key. If the content is statutory, the previously described pseudo-serial number N' is used as the encrypting key at step 706. Following either step 704 or step 706, at step 708, the encrypted audio content item is transferred to portable device 200 as part of a synchronization event. The synchronization event may occur when the portable device is docked to a client or over some type of network, whether it be a local network or a wide area network.

Figure 8:
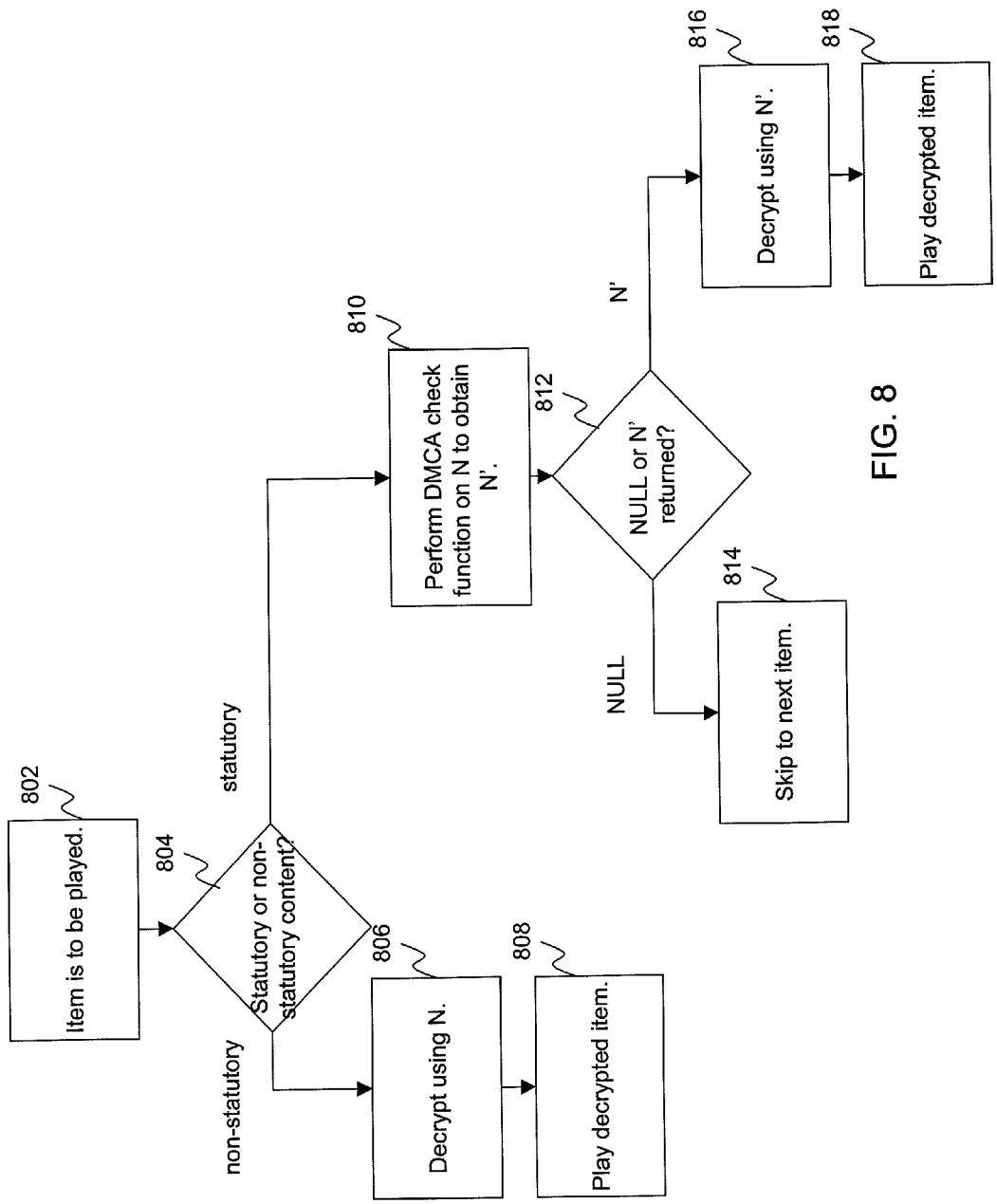
FIG. 8 is a flowchart describing steps of playing back audio content according to a first embodiment of the present invention.

FIG. 8 is a flowchart describing steps of playing content on a portable device where the content has been encrypted according to the technique of FIG. 7. A step 802 represents an event that would lead to play of an audio content item. Examples include a skip request, selection of a channel, or simply completion of play of a previous audio content item. A step 804 tests whether the audio content item to be played is statutory or non-statutory. If the content is non-statutory, processor code decrypts the content using N as a decryption key at step 806 and the audio content item is played at step 808.

If step 804 determines the content to be statutory then, at step 810, processor 210 invokes a function SRND_DMCA_ID using the device serial number N as input. The function will return N' if DMCA compliance rules are satisfied and NULL otherwise. The DMCA check includes verifying compliance with the above-mentioned DMCA rules. The DMCA check thus involves consulting a playback history to verify compliance with rules two through five and tracking elapsed time within a channel to determine when a channel can be looped (rule 6) and when it should be deleted (rule 8). Also, as part of the DMCA check, the relevant playlist is checked against its authentication code that was included in the playlist file to assure that there has been no tampering with the playlist contents. The records of the log file are similarly checked (or may be checked at some other time). If either the playlist or the log file has been deleted or tampered with, the DMCA check fails. If DMCA check fails for any reason, NULL is returned rather than N'. If a log file has been impermissibly modified or deleted, all of the statutory content may be deleted. These DMCA check steps are implemented by microprocessor code such that circumvention is very difficult.

Step 812 tests whether NULL or N' is returned. If NULL is returned then, at step 814, an error message is displayed or possibly audiblized. If DMCA check failed because of an illegal ordering of songs, artists, or albums, then the next item on the playlist is selected for possible playback and the DMCA check procedure repeats. If DMCA check fails because the content should be deleted, deletion occurs now. If DMCA check fails because the content is stale, has been played too often, or there have been no sufficiently recent synchronization events, the user is cued to resynchronize her device to obtain fresh content. If N' is returned, the item is decrypted using N' as a key at step 816 and played back at step 818. The playback history information used for DMCA check is updated as a part of step 818.

Figure 9:
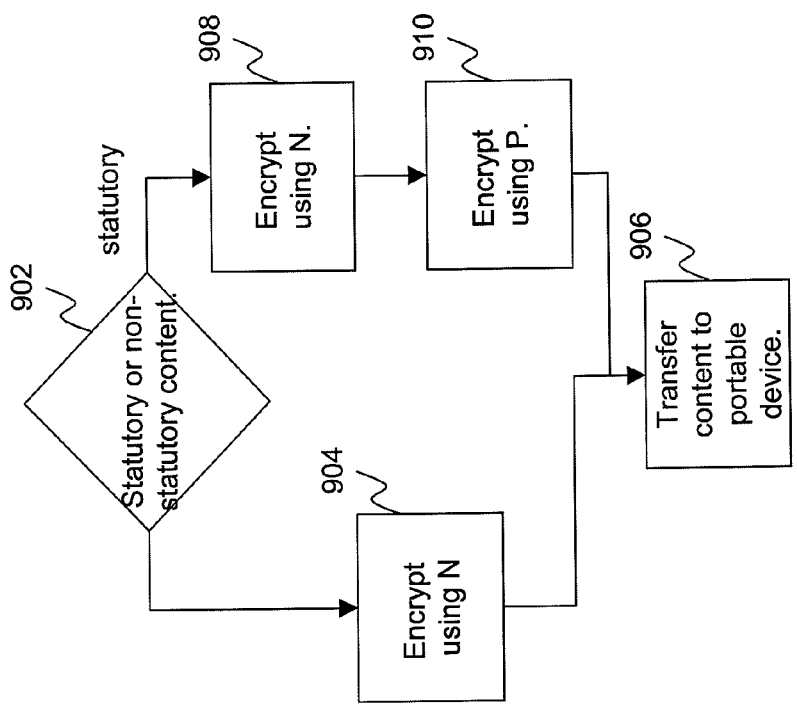
FIG. 9 is a flowchart describing steps of preparing audio content for transfer to a portable device according to a second embodiment of the present invention.

FIG. 9 is a flowchart describing an alternative way to transfer content. Non-statutory content is handled in a similar way to that described in reference to FIG. 7 and steps 902, 904, and 906 are essentially similar to steps 702, 704, and 706, respectively, in FIG. 7. In FIG. 9, statutory content is handled by using two layers of encryption. At step 908, the audio content item is encrypted in accordance with the Windows DRM scheme using the portable device serial number N. Then at step 910, a second layer of encryption is applied using a key P. This second layer of encryption is used to enforce the content play restrictions.

Figure 10:
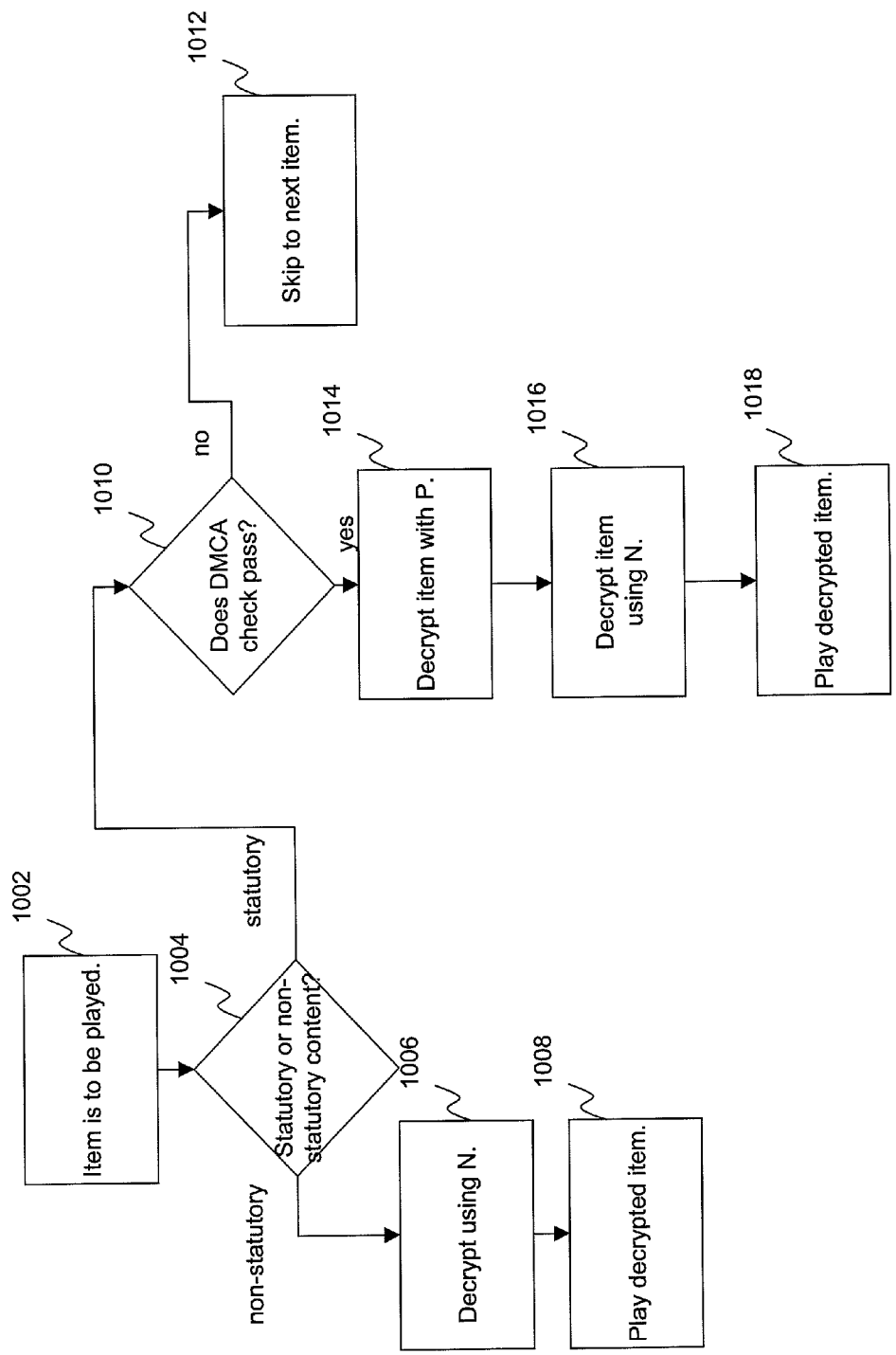
FIG. 10 is a flowchart describing steps of playing back audio content according to a second embodiment of the present invention.

FIG. 10 is a flowchart describing steps of using a portable device to play content that has been encrypted in the way described in connection to FIG. 9. Steps 1002, 1004, 1006, and 1008 operate in the same way as comparable steps 802, 804, 806, and 808, respectively, in FIG. 8. For statutory content, a step 1010 determines whether the DMCA check passes. If the DMCA check doesn't pass then, at step 1012, the previously discussed consequences of a failed DMCA check follow. If the DMCA check does pass then at step 1014, the first layer of encryption is removed from the audio content item by use of the key P. The key P and the decryption process are maintained at the firmware level to avoid decryption. Then at step 1016 the DRM encryption is removed using the serial number N as the key, again at the firmware level. At step 1018, the decrypted content is played back for the user. The playback history information is updated to reflect playback of the content in conjunction with step 1018.

Procedure for Logging Playback

Another aspect of DMCA compliance is logging content playback and aggregating user playback statistics to assess necessary royalty payments. FIG. 11 is a flowchart describing steps that occur on portable device 200 to support this process in a secure way according to one embodiment of the present invention. At step 1102, a statutory audio content item is played on portable device 200. At step 1104, portable device 200 updates its log file to reflect that the content has been played and for how long. This step involves decrypting the log file, adding a new record, and reencrypting the log file. It should again be noted that if the log file is unavailable or the authentication code indicates tampering the content item will not be played in the first place. The record will include an asset ID (found in the .srnd file header) identifying the audio content item, an event ID identifying the logged event as a playback event, and a time stamp indicating the time of the playback event.

Steps 1102 and 1104 will repeat for every playback event. Then at step 1106, the log file is transferred to station 100 at the next synchronization. Station 100 can then send the logged information to an appropriate database server, at step 1108, so that statistics can be evaluated and royalty payments can be computed. Preferably, the playback log information is anonymized so that individual usage information is unavailable. It is also possible to directly transfer information from the portable device to the database server without using station 100 as a staging device. It should also be noted that station 100 and/or the database server can filter out playback events shorter than 30 seconds since royalty payments will not typically be due for these.

Using DMCA Check to Introduce Advertisements and Announcements

Playlists can contain pointers to audio other than songs. This includes advertisements, announcements, etc.

For example, a DMCA-compliant playlist can include a mixture of songs, announcements, and advertisements as follows:

[Srnd1, Srnd2, Playlist Ad1, Srnd3, Playlist Ad2, Srnd4, Announcement List 1, Srnd5] where srndn refers to a song, Playlist Adn refers to an advertisement playlist, and Announcement List n refers to an announcement playlist.

A representative advertisement playlist would then be structured as follows:

Playlist Ad1 [Ad1, Ad2, Ad3, Ad4,]. The rules field would specify that an advertisement from this playlist would only be played from 4 PM to 6 PM. A running pointer of played items should be maintained and playback of the advertisements is looped when the last advertisement is reached.

Another representative advertisement playlist would be structured as follows:

Playlist Ad2 [Ad1, Ad2, Ad3, . . . ]. The rules field here also specifies a running pointer and looped playback but these advertisements are only played after 8 PM on Saturday nights.

A representative announcement playlist is as follows.

Announcement List 1 [Announcement 1, Announcement 2, . . . . ] The rule field for this list specifies that it is only to be played on Aug. 8, 2004.

The primary playlist, advertisement playlists, and announcement playlists are established and appropriately encrypted on a server and transferred to a user station or portable device in any of the ways previously described. The playlist rules fields of the advertisement and announcement playlists include appropriate limitations on content playback.

When the original playlist is being played, reference to an advertisement playlist or announcement playlist causes a redirection to the referenced playlist to obtain the next item for playback from there. However, these advertisements and announcements are still subject to DMCA check which is used in a special way. For advertisements, during DMCA check the absolute date and/or time is checked against the permitted play period, if there is a match then the currently pointed advertisement is played back. This allows restriction of advertisements to time contexts where they are relevant. For announcements, during DMCA check the date is checked against the date specified by the rules field and if there is a match, the announcement is played.

The announcement playlists and advertisement playlists are tailored to the particular user. For example, they may be customized with reference to demographic data as available at a server that transfers content to the station. The announcement playlists and advertisement playlists may also be customized based on input from another user such as a friend. For example, another user may request that a birthday greeting be inserted as an announcement. Such requests may be made by, e.g., email, by cellphone SMS, etc. Announcements can include, e.g., jingles, user-recorded messages, user text messages that have been converted to speech, etc.

The use of pointers to announcement and advertisement playlists provides flexibility. While all users share the same "broadcast playlist," the advertisements and announcements can be tailored to specific characteristics. No modification or customization of the broadcast playlists is required. The rules associated with announcement and advertisement playlists provide flexibility to download the audio content to portable devices well in advance of the required playback time. A portable device without a network connection can play what seems like fresh content even when it has not been refreshed recently. For example, a birthday greeting may have been loaded up to a month in advance and will playback on the birthday, as long as the user has connected the device to the network at least once within the prior month.

The announcement and advertisement features are not restricted to statutory content and apply equally to non-statutory content. Furthermore, in addition to time-based constraints, the DMCA check function can also be used to constrain playback based on location by employing GPS or other location discovery tools. The announcement and advertisement features are applicable to both station clients and portable device clients that obtain their content through synchronization.

Requesting Content to be Played for Other Users

A friend can also request that a particular song be played back in one of the user's playlists subject to the usual DMCA restrictions including the requirement that specific sound recordings may not be played within one hour of a request by a listener or at a time specifically designated by the listener.

Such a request mechanism can be implemented in many ways. For example, Friend1 sends a request to a specified email address at the media service provider. The request indicates a particular song and the email address of a Friend2 for whom the song has been requested. The song is identified by an asset identifier. Friend2 is identified by an email address.

The asset identifier can be generated in a number of ways. For example: When Friend1 was listening on her portable device she tags a song by clicking on a "Info/Remember Me" button. This user interaction is logged. When synchronizing to the station, the tagged song's name and artist name are displayed by the station for further action by Friend1. The action could be to "purchase" the song or "play" it for my Friend2. Friend1 enters the email address of Friend2 with action specified to "play." The asset ID is locally available from the playlist or .srnd file header. An email with the necessary information is automatically generated and sent.

Alternatively, Friend1 specifies the song name and the email address of Friend2 in an email to the media service provider. An automatic software function will translate the song name requested by email into an asset identifier. Human intervention occurs when automatic matching fails.

On a periodic basis (e.g., daily), new and refreshed DMCA-compliant playlists are generated for each channel by a DJ or automatic software. The playlists are broadcast to the relevant playlist subscribers. However, individual playlists may be modified for subscribers for whom content has been requested by others. These playlists are modified to include the request song and possibly an announcement.

There are a variety of playlist modification mechanisms that can be employed for this purpose. In one such mechanism, for each subscriber, for each song in the playlist, a check is run through a database to see if there have been requests for that song for that subscriber. If "yes", then the playlist is modified/customized for the "requestee" and a pointer is placed in the playlist to play an "announcement" before the song is played. The announcement in this case is another audio asset and is just part of the same playlist. The Announcement says, e.g., "Jill has requested this song for you—here it is . . . ". The playlist is then transferred to the requestee's station or portable device. With this mechanism, the requestee does not hear of the user's request until the requested song is programmed into a channel she subscribes to.

In an alternate playlist modification mechanism, modification of the playlist results in the actual insertion of the specific song in a DMCA compliant manner. The requested song along with the announcement is inserted into the broadcast playlist in a DMCA compliant manner. The playlist is then transferred to the requestee's station or portable device. In this alternate mechanism, the request is likely to be played sooner since there is no requirement for the requested song to be programmed into the channel.

CONCLUSION

It will be appreciated that the statutory audio content service, announcement and advertisement service, and "request for a friend" service that have been presented have many benefits. Statutory audio content is now available on portable devices even when those devices lack network access. Content is transferred to the portable device at relatively low cost since real-time streaming to the device is not a requirement. The ability to avoid real-time streaming is particularly advantageous where there is no constantly available network connection to the portable device or only a relatively expensive and unreliable wireless connection. Additionally, content may be readily customized for a user and his situation. Such customization may occur by request of another user.

It is understood that the examples and embodiments that are described herein are for illustrative purposes only and that various modifications and changes in light thereof will be suggested to persons skilled in the art and are to be included within the spirit and purview of this application and scope of the intended claims and their full scope of equivalents.

What is claimed is:

1. A method for permitting playback of digital content comprising:
   retrieving a list of encrypted digital content at a portable device, wherein the encrypted digital content includes a plurality of content types, the plurality of content types including a first content type and a second content type, and wherein the first content type is encrypted using a first encryption scheme and the second content type is encrypted using a second encryption scheme;
   identifying each of a plurality of items of encrypted digital content on the retrieved list as being of a first content type or a second content type;
   decrypting a second content type using a first key maintained at a firmware level;
   decrypting a first content type item using a second key maintained at the firmware level when the first content type item satisfies a plurality of content play rules, wherein the content play rules require location of the portable device within one or more predefined locations; and
   permitting playback of the decrypted second content type items and the decrypted first content type items on the portable device, wherein playback of each content type items is permitted until at least one content play rule has been violated.

2. The method of claim 1, wherein at least one content play rule limits content looping to a predetermined number of times.

3. The method of claim 1, wherein at least one content play rule requires content deletion after a predetermined period of time.

4. The method of claim 1, wherein at least one content play rule requires content deletion after a predetermined number of content loops.

5. The method of claim 1, wherein at least one content play rule limits content skipping to a predetermined number of times.

6. The method of claim 1, wherein at least one content play rule requires content shuffling after a predetermined number of content loops.

7. The method of claim 1, further comprising decrypting a digital log file, updating the digital log file, and re-encrypting the digital log file when playback occurs.

8. The method of claim 7, wherein the digital log file includes at least one content identification and at least one length of playback associated with a playback.

9. The method of claim 1, wherein at least one content play rule is predetermined by a content owner.

10. The method of claim 1, wherein at least one content play rule is predetermined by a content provider.

11. A system for permitting playback of digital content, the system comprising:
   memory; and
   a processor that executes instructions stored in memory, wherein execution of the instructions by the processor:
      retrieves at list of encrypted digital content at a portable device, wherein the encrypted digital content includes a plurality of content types, the plurality of content types including a first content type and a second content type, and wherein the first content type is encrypted using a first encryption scheme and the second content type is encrypted using a second encryption scheme,
      identifies each of a plurality of items of encrypted digital content on the retrieved list as being of a first content type or a second content type,
      decrypts a second content type using a first key maintained at a firmware level,
      decrypts a first content type item using a second key maintained at the firmware level when the first content type item satisfies a plurality of content play rules, wherein the content play rules require location of the portable device within one or more predefined locations, and
      permits playback of the decrypted second content type items and the decrypted first content type items on the portable device, wherein playback of each content type items is permitted until at least one content play rule has been violated.

12. The system of claim 11, wherein at least one content play rule limits content looping to a predetermined number of times.

13. The system of claim 11, wherein at least one content play rule requires content deletion after a predetermined period of time.

14. The system of claim 11, wherein at least one content play rule requires content deletion after a predetermined number of content loops.

15. The system of claim 11, wherein at least one content play rule limits content skipping to a predetermined number of times.

16. The system of claim 11, wherein at least one content play rule requires content shuffling after a predetermined number of content loops.

17. The system of claim 11, wherein a digital log file is decrypted, updated, and reencrypted when playback occurs.

18. The system of claim 17, wherein the digital log file includes at least one content identification and at least one length of playback associated with a playback.

19. The system of claim 11, wherein at least one content play rule is predetermined by a content owner.

20. A non-transitory computer-readable storage medium having embodied thereon a program executable by a processor to perform a method for permitting playback of digital content, the method comprising:
   retrieving a list of encrypted digital content at a portable device, wherein the encrypted digital content includes a plurality of content types, the plurality of content types including a first content type and a second content type, and wherein the first content type is encrypted using a first encryption scheme and the second content type is encrypted using a second encryption scheme,
   identifying each of a plurality of items of encrypted digital content on the retrieved list as being of a first content type or a second content type,
   decrypting a second content type using a first key maintained at a firmware level,
   decrypting a first content type item using a second key maintained at the firmware level when the first content type item satisfies a plurality of content play rules, wherein the content play rules require location of the portable device within one or more predefined locations, and
   permitting playback of the decrypted second content type items and the decrypted first content type items on the portable device, wherein playback of each content type items is permitted until at least one content play rule has been violated.

* * * * *